(12) United States Patent
Uoe et al.

(10) Patent No.: US 9,302,409 B2
(45) Date of Patent: Apr. 5, 2016

(54) METHOD FOR PRODUCING HONEYCOMB STRUCTURE AND SEALING JIG FOR GREEN HONEYCOMB MOULDED ARTICLE

(71) Applicant: SUMITOMO CHEMICAL COMPANY, LIMITED, Tokyo (JP)

(72) Inventors: Kousuke Uoe, Niihama (JP); Teruo Komori, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 14/435,390

(22) PCT Filed: Oct. 7, 2013

(86) PCT No.: PCT/JP2013/077261
§ 371 (c)(1),
(2) Date: Apr. 13, 2015

(87) PCT Pub. No.: WO2014/061495
PCT Pub. Date: Apr. 24, 2014

(65) Prior Publication Data
US 2015/0298349 A1    Oct. 22, 2015

(30) Foreign Application Priority Data

Oct. 15, 2012   (JP) .................. 2012-228189

(51) Int. Cl.
*B32B 37/00* (2006.01)
*B28B 11/00* (2006.01)
(Continued)

(52) U.S. Cl.
CPC .......... *B28B 11/006* (2013.01); *B01D 46/0001* (2013.01); *B01D 46/2444* (2013.01); *B29C 65/08* (2013.01); *F01N 3/0222* (2013.01); *F01N 3/2828* (2013.01)

(58) Field of Classification Search
CPC ...... B29C 65/08; B28B 11/006; B32B 37/06; B65B 51/225; B01D 46/2444; B01D 46/0001; F01N 3/0222
USPC ................................ 156/73.1, 580.1, 580.2
See application file for complete search history.

(56) References Cited

U.S. PATENT DOCUMENTS

| 7,541,085 B2 * | 6/2009 | Burdon ............... B29D 99/0021 156/60 |
| 8,349,432 B2 * | 1/2013 | Higuchi ............. B01D 46/2474 156/89.22 |

(Continued)

FOREIGN PATENT DOCUMENTS

| CN | 1497138 A | 5/2004 |
| JP | 2004-019498 A | 1/2004 |

(Continued)

OTHER PUBLICATIONS

International Preliminary Report on Patentability and Written Opinion issued Apr. 30, 2015 in counterpart International Application No. PCT/JP2013/077261.

(Continued)

*Primary Examiner* — James Sells
(74) *Attorney, Agent, or Firm* — Sughrue Mion, PLLC

(57) ABSTRACT

A closing jig for a green honeycomb molded body includes closing protrusions which are arranged at positions corresponding to regular hexagonal cells and are inserted into the regular hexagonal cells to weld partition walls to each other for closing. Each of the closing protrusions includes a conical tip end portion that has a conical shape, and a triangular pyramidal base portion with a truncated triangular pyramidal shape having an apex angle larger than an apex angle of the conical tip end portion. The conical tip end portion has the conical shape with an acute apex angle. The triangular pyramidal base portion has the truncated triangular pyramidal shape having the large apex angle.

12 Claims, 40 Drawing Sheets

(51) Int. Cl.
*F01N 3/28* (2006.01)
*F01N 3/022* (2006.01)
*B01D 46/00* (2006.01)
*B01D 46/24* (2006.01)
*B29C 65/08* (2006.01)

(56) References Cited

U.S. PATENT DOCUMENTS

| | | | |
|---|---|---|---|
| 2003/0041575 A1 | 3/2003 | Ishihara et al. | |
| 2004/0018123 A1 | 1/2004 | Okawara et al. | |
| 2004/0055264 A1 | 3/2004 | Itoh | |
| 2006/0197252 A1 | 9/2006 | Ishikawa et al. | |
| 2008/0292843 A1* | 11/2008 | Oya | B01D 46/2429 428/116 |
| 2009/0252906 A1* | 10/2009 | Higuchi | B01D 46/2474 428/34.4 |

FOREIGN PATENT DOCUMENTS

| | | |
|---|---|---|
| JP | 2004-042440 A | 2/2004 |
| JP | 2004-116369 A | 4/2004 |
| JP | 2004-322051 A | 11/2004 |
| JP | 2006-272318 A | 10/2006 |

OTHER PUBLICATIONS

Office Action issued Jun. 23, 2015 in counterpart Korean Patent Application No. 10-2015-7012591 with translation.

International Search Report for PCT/JP2013/077261 dated Dec. 17, 2013.

First Office Action issued Nov. 4, 2015 in Chinese Patent Application No. 201380053969.9 with translation.

* cited by examiner

METHOD FOR PRODUCING HONEYCOMB STRUCTURE AND SEALING JIG FOR GREEN HONEYCOMB MOULDED ARTICLE

CROSS REFERENCE TO RELATED APPLICATIONS

This application is a National Stage of International Application No. PCT/JP2013/077261 filed Oct. 7, 2013, claiming priority based on Japanese Patent Application No. 2012-228189 filed Oct. 15, 2012, the contents of all of which are incorporated herein by reference in their entirety.

TECHNICAL FIELD

An embodiment of the invention relates to a closing jig for a green honeycomb molded body, and a method for producing a honeycomb structure, and relates to a closing jig for a green honeycomb molded body that becomes a honeycomb structure through calcining, and a method for producing a honeycomb structure.

BACKGROUND ART

In the related art, for example, a ceramic honeycomb structure having a plurality of through-holes having a polygonal cross-sectional shape has been known. The honeycomb structure is used in a diesel particulate filter, and the like. The honeycomb structure is produced by molding a ceramic raw material powder by an extruding method and the like to prepare a green honeycomb molded body, cutting the green honeycomb molded body to have a desired length, closing the green honeycomb molded body, and calcining the green honeycomb molded body. As a method for closing the green honeycomb molded body, for example, as disclosed in Patent Literature 1, a method for using a pressing jig for closing is suggested. The pressing jig for closing which is disclosed in Patent Literature 1 has a pin-holder shape including a heater unit and a plurality of needles which protrude from the heater unit, and the plurality of needles can be heated by the heater unit. In addition, the plurality of needles are constituted by a straight portion having a square cross-sectional shape, and a tip end portion which is formed at the tip end of the straight portion and has a pyramid shape. In addition, in a state in which the plurality of needles are heated by the heater unit, the plurality of needles are inserted into through-holes of the green honeycomb molded body to deform the through-holes, thereby closing the through-holes.

CITATION LIST

Patent Literature

Patent Literature 1: Japanese Unexamined Patent Application Publication No. 2004-19498

SUMMARY OF INVENTION

Technical Problem

However, in the method described in Patent Literature 1, in a case where the position of the through-holes of the green honeycomb molded body deviates from the normal position, insertion of the jig may be difficult in some cases, and thus efficiency of a closing step may decrease.

An embodiment of the invention has been made in consideration the above-described problem, and an object thereof is to provide a closing jig for a green honeycomb molded body, and a method for producing a honeycomb structure in which insertion into through-holes is easy, and which are capable of closing the green honeycomb molded body in a relatively efficient manner.

Solution to Problem

According to an embodiment of the invention, there is provided a closing jig for a green honeycomb molded body in which a plurality of through-holes partitioned from each other by partition walls are opened to an end surface of a columnar body, and which becomes a honeycomb structure, in which a plurality of holes are opened to the end surface of the columnar body, when being calcined. The closing jig includes a plurality of closing protrusions which are arranged at positions corresponding to parts of the plurality of the through-holes, and are inserted into the parts of the plurality of through-holes to weld the partition walls to each other so as to close the through-holes. Each of the closing protrusions includes a conical tip end portion which is located at a tip end portion of the closing protrusion and has a conical shape, and a pyramidal base portion which is located at a base portion of the closing protrusion, and has a truncated pyramidal shape obtained by removing a pyramid which is analogously reduced from a pyramid having an apex angle larger than an apex angle of the conical tip end portion.

According to this configuration, the closing jig is a closing jig for the green honeycomb molded body in which the plurality of through-holes partitioned from each other by the partition walls are opened to the end surface of the columnar body, and which becomes the honeycomb structure, in which the plurality of holes are opened to the end surface of the columnar body, when being calcined. The closing jig includes the plurality of closing protrusions which are arranged at positions corresponding to parts of the plurality of the through-holes, and are inserted into the parts of the plurality of through-holes to weld the partition walls to each other so as to close the through-holes. Each of the closing protrusions includes the conical tip end portion which is located at the tip end portion of the closing protrusion and has the conical shape, and the pyramidal base portion which is located at the base portion of the closing protrusion, and has the truncated pyramidal shape obtained by removing the pyramid which is analogously reduced from the pyramid having the apex angle larger than the apex angle of the conical tip end portion. The conical tip end portion has the conical shape with an acute apex angle, and thus even when positional deviation slightly occurs in the through-holes of the green honeycomb molded body, it is easy to insert the conical tip end portion into each of the through-holes. In addition, the pyramidal base portion has the truncated pyramidal shape obtained by removing the pyramid which is analogously reduced from the pyramid having the apex angle larger than the apex angle of the conical tip end portion, and thus it becomes easier to weld the partition walls to each other by pressing and expanding the partition walls at side surfaces thereof. Accordingly, it is possible to close the green honeycomb molded body in a relatively efficient manner.

In this case, each of lateral edges of the pyramidal base portion may be round-chamfered with a predetermined curvature.

According to this configuration, each of the lateral edges of the pyramidal base portion is round-chamfered with a predetermined curvature. According to this, it is possible to prevent the partition walls of the green honeycomb molded body from being cut out due to the lateral edges of the pyramidal base portion. In a case where the closing protrusions which are vibrated with ultrasonic waves are inserted into the through-holes, when the lateral edge is round-chamfered, it is possible to effectively prevent the partition wall from being cut out.

In addition, a valley between the pyramidal base portions of the closing protrusions adjacent to each other may be round-chamfered with a predetermined curvature.

According to this configuration, since the valley between the pyramidal base portions of the closing protrusions adjacent to each other is round-chamfered with a predetermined curvature, ends of the partition walls which are welded to each other by the closing protrusions are round-chamfered. Accordingly, the ends of the partition walls are reliably welded to each other, and thus an omission in closing is prevented. In addition, in the case of using the honeycomb structure as a diesel particulate filter, turbulence in the flow of an exhaust gas is less likely to occur at end surfaces on an exhaust gas supply side and/or on an exhaust gas discharging side, and thus it is possible to reduce a pressure drop.

In addition, the closing protrusions may be inserted into the parts of the through-holes while being vibrated with ultrasonic waves to weld the partition walls to each other so as to close the through-holes.

According to this configuration, the closing protrusions are inserted into the parts of the through-holes while being vibrated with ultrasonic waves to weld the partition walls to each other so as to close the through-holes. When the closing protrusions, which are vibrated with the ultrasonic waves, are inserted into the through-holes, the partition walls liquefy. Accordingly, fuzz and the like are less likely to occur in a processing surface, and the processing surface becomes satisfactory. As a result, ends of the partition walls are reliably welded to each other, and thus it is possible to prevent an omission in closing. In addition, the ends of the partition walls, which are welded to each other, become smooth ends. Accordingly, in the case of using the honeycomb structure as the diesel particulate filter, turbulence in the flow of an exhaust gas is less likely to occur at end surfaces on the exhaust gas supply side and/or on the exhaust gas discharging side, and thus it is possible to reduce a pressure drop.

In addition, the closing protrusions may be arranged at positions corresponding to six through-holes which are adjacent to the periphery of one through-hole among the plurality of through-holes having a hexagonal shape while centering around the one through-hole, the pyramidal base portion may have a truncated triangular pyramidal shape obtained by removing a triangular pyramid that is analogously reduced from a triangular pyramid having an apex angle larger than an apex angle of the conical tip end portion, and lateral edges of the pyramidal base portion may come into contact with the partition walls.

According to this configuration, the closing protrusions are arranged at the positions corresponding to the six through-holes which are adjacent to the periphery of the one through-hole among the plurality of through-holes having the hexagonal shape while centering around the one through-hole. In addition, the pyramidal base portion has the truncated triangular pyramidal shape obtained by removing the triangular pyramid that is analogously reduced from the triangular pyramid having the apex angle larger than the apex angle of the conical tip end portion, and the lateral edges of the pyramidal base portion come into contact with the partition walls. According to this, the closing protrusions are inserted into the six through-holes which are adjacent to the periphery of the one through-hole while centering around the one through-hole. In addition, the through-hole that is located at the center of the six through-holes is pressed by the lateral edges of the pyramidal base portions in the closing protrusions which are inserted, and the partition walls are welded to each other to close the central through-hole. According to this, for example, in the case of using the honeycomb structure as the diesel particulate filter, it is possible to efficiently perform closing on an exhaust gas supply side.

In addition, the closing protrusions may be arranged at positions corresponding to four through-holes which are adjacent to the periphery of one through-hole among the plurality of through-holes having a rectangular shape while centering around the one through-hole with the partition walls partitioning respective sides of the one rectangular through-hole interposed therebetween, the pyramidal base portion may have a truncated quadrangular pyramidal shape obtained by removing a quadrangular pyramid that is analogously reduced from a quadrangular pyramid having an apex angle larger than an apex angle of the conical tip end portion, and lateral edges of the pyramidal base portion may come into contact with the partition walls.

According to this configuration, the closing protrusions are arranged at the positions corresponding to the four through-holes which are adjacent to the periphery of the one through-hole among the plurality of through-holes having the rectangular shape while centering around the one through-hole with the partition walls partitioning respective sides of the one rectangular through-hole interposed therebetween. The pyramidal base portion has the truncated quadrangular pyramidal shape obtained by removing the quadrangular pyramid that is analogously reduced from the quadrangular pyramid having the apex angle larger than the apex angle of the conical tip end portion, and the lateral edges of the pyramidal base portion come into contact with the partition walls. Accordingly, the closing protrusions are inserted into the four through-holes which are adjacent to the periphery of the one through-hole having the rectangular shape while centering around the one through-hole with the partition walls partitioning the respective sides of the one through-hole interposed therebetween. In addition, the through-hole that is located at the center of the four through-holes is pressed by the lateral edges of the pyramidal base portions in the closing protrusions which are inserted, and the partition walls are welded to each other, and thus the central through-hole is closed. In this case, for example, when a through-hole, which is not closed at one end of the green honeycomb molded body, is closed at the other end, for example, in the case of using the honeycomb structure as the diesel particulate filter, it is possible to efficiently perform closing on the exhaust gas supply side and on the exhaust gas discharging side.

In addition, according to another embodiment of the invention, there is provided a method for producing a honeycomb structure in which a plurality of holes are opened to an end surface of a columnar body. The method includes a closing step of inserting a plurality of closing protrusions of a closing jig into parts of a plurality of through-holes of a green honeycomb molded body, in which the plurality of through-holes partitioned from each other by partition walls are opened to an end surface of a columnar body and which becomes the honeycomb structure when being calcined, to weld the partition walls to each other so as to close the through-holes. In the closing step, the through-holes are closed by using the closing jig in which the closing protrusions are arranged at positions corresponding to the parts of the plurality of through-holes, and each of the closing protrusions includes a conical tip end portion which is located at a tip end portion of the closing protrusion and has a conical shape, and a pyramidal base portion which is located at a base portion of the closing protrusion and has a truncated pyramidal shape obtained by removing a pyramid analogously reduced from a pyramid having an apex angle larger than an apex angle of the conical tip end portion.

In this case, in the closing step, the through-holes may be closed by using the closing jig in which each lateral edge of the pyramidal base portion is round-chamfered with a predetermined curvature.

In addition, in the closing step, the through-holes may be closed by using the closing jig in which a valley between the pyramidal base portions of the closing protrusions adjacent to each other is round-chamfered with a predetermined curvature.

In addition, in the closing step, the closing protrusions may be inserted into the parts of the through-holes while being vibrated with ultrasonic waves to weld the partition walls to each other so as to close the through-holes.

In addition, in the closing step, the through-holes may be closed by using the closing jig in which the closing protrusions are arranged at positions corresponding to six through-holes which are adjacent to the periphery of one through-hole among the plurality of through-holes having a hexagonal shape while centering around the one through-hole, the pyramidal base portion may have a truncated triangular pyramidal shape obtained by removing a triangular pyramid that is analogously reduced from a triangular pyramid having an apex angle larger than an apex angle of the conical tip end portion, and lateral edges of the pyramidal base portion may come into contact with the partition walls.

In addition, in the closing step, the through-holes may be closed by using the closing jig in which the closing protrusions are arranged at positions corresponding to four through-holes which are adjacent to the periphery of one through-hole among the plurality of through-holes having a rectangular shape while centering around the one through-hole with the partition walls partitioning respective sides of the one rectangular through-hole interposed therebetween, the pyramidal base portion may have a truncated quadrangular pyramidal shape obtained by removing a quadrangular pyramid that is analogously reduced from a quadrangular pyramid having an apex angle larger than an apex angle of the conical tip end portion, and lateral edges of the pyramidal base portion may come into contact with the partition walls.

Advantageous Effects of Invention

According to the closing jig for a green honeycomb molded body, and the method for producing the honeycomb structure of the embodiment of the invention, insertion into the through-holes becomes easy, and it is possible to close the green honeycomb molded body in a relative efficient manner.

DESCRIPTION OF EMBODIMENTS

Hereinafter, embodiments of the invention will be described in detail with reference to the attached drawings.

[First Embodiment]

(Green Honeycomb Molded Body (Regular Hexagonal Cell))

Figure 1:
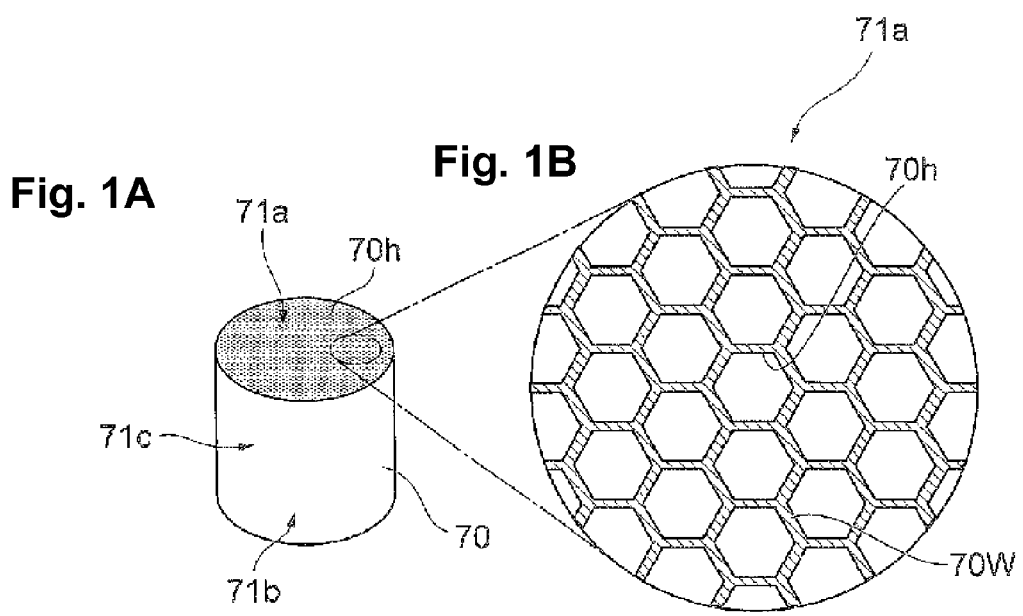
FIG. 1A is a perspective view of a green honeycomb molded body having regular hexagonal cells before closing.
FIG. 1B is a partially enlarged view of A.

First, description will be given to a green honeycomb molded body that is an object to be processed in a first embodiment of the invention. As illustrated in FIG. 1A, for example, a green honeycomb molded body 70 according to this embodiment is a cylindrical body having a top surface 71a, a bottom surface 71b, and a side surface 71c. Regular hexagonal cells 70h, which are a plurality of through-holes having a regular hexagonal shape, are arranged in the top surface 71a and the bottom surface 71b in an approximately parallel manner. The green honeycomb molded body 70 is a non-calcined molded body which becomes a porous ceramics after being subjected to subsequent calcining. In addition, a length of the green honeycomb molded body 70 in an extension direction of the regular hexagonal cells 70h is not particularly limited, and may be set, for example, to 40 mm to 350 mm. In addition, an external diameter of the green honeycomb molded body 70 is also not particularly limited, and may be set, for example, to 10 mm to 320 mm.

The regular hexagonal cells 70h are partitioned by partition walls 70W that extend approximately parallel with the central axis of the green honeycomb molded body 70. The thickness of the partition walls 70W may be set to 0.8 mm or less, 0.5 mm or less, 0.1 mm or more, or 0.2 mm or more. In addition, the external shape of the green honeycomb molded body 70 is not limited to the cylindrical body, and may be an elliptical column, angular columns (for example, regular polygonal columns such as a regular triangular column, a regular quadrangular column, a regular hexagonal column, and a regular octagonal column, a triangular column, a quadrangular column, a hexagonal column, an octagonal column, and the like other than the regular polygonal column), and the like. However, in this embodiment, description will be given to a case where the honeycomb structure 70 is configured of the cylindrical body. In addition, in this embodiment, the green honeycomb molded body 70 having the regular hexagonal cells 70h which are regular hexagonal through-holes is exemplified, but the green honeycomb molded body 70 may have cells which are through-holes having hexagonal shapes other than the regular hexagon shape or other sizes.

The green honeycomb molded body 70 is produced by extrusion-molding a ceramic composition by using an extrusion molding machine. In this case, to prepare the ceramic composition, an inorganic compound source powder that is a ceramic raw material, an organic binder, a solvent, and an additive that is added as necessary are prepared.

The inorganic compound source powder includes an aluminum source powder and a titanium source powder. The inorganic compound source powder may further include a magnesium source powder and/or a silicon source powder. Examples of the organic binder include celluloses such as methyl cellulose, carboxymethyl cellulose, hydroxyalkyl methyl cellulose, and sodium carboxymethyl cellulose; alcohols such as polyvinyl alcohol; and lignosulfonate. Examples of the additive include a cell forming agent, a lubricant, a plasticizer, a dispersant, and a solvent.

The prepared raw materials are mixed with each other by a kneader and the like to obtain a raw material mixture, and the raw material mixture that is obtained is extruded by using the extrusion molding machine, which has outlet openings corresponding to a cross-sectional shape of the partition walls 70W, to prepare the green honeycomb molded body according to this embodiment.

(Ultrasonic Cutting Machine)

Figure 2:
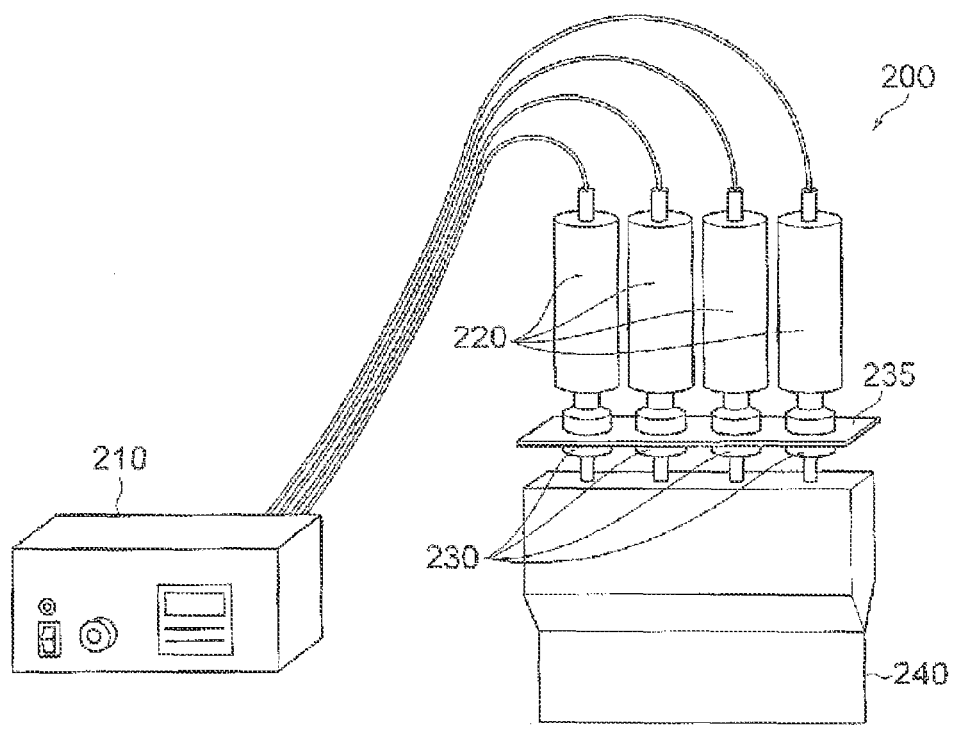
FIG. 2 is a perspective view illustrating a device configured to cut out a green honeycomb molded body according to a first embodiment.

Hereinafter, an ultrasonic cutting machine of this embodiment will be described. As illustrated in FIG. 2, an ultrasonic cutting machine 200 of this embodiment includes an ultrasonic signal transmitter 210, an ultrasonic vibrator unit 220, a horn unit 230, a support plate 235, and a cutting blade 240. The ultrasonic signal transmitter 210 transmits an electrical ultrasonic signal. The ultrasonic vibrator unit 220 converts the electrical ultrasonic signal, which is supplied from the ultrasonic signal transmitter 210, to mechanical ultrasonic vibration. The horn unit 230 amplifies the amplitude of the ultrasonic vibration supplied from the ultrasonic vibrator unit 220. In this embodiment, a plurality of the ultrasonic vibrator units 220, which are connected to the ultrasonic signal transmitter 210, are connected to a plurality of the horn units 230, respectively. The plurality of horn units 230 are arranged in parallel along the blade width of the cutting blade 240 by the support plate 235. The cutting blade 240 is vibrated at a frequency of approximately 20 kHz to 40 kHz by the ultrasonic vibration supplied from the horn unit 230.

When the cutting blade 240 comes into contact with the green honeycomb molded body 70, the contact portion of the green honeycomb molded body 70 liquefies, and thus it is possible to perform the cutting with a small machining amount without causing deformation, burr, and the like of the regular hexagonal cells 70h. In addition, a mechanism that suctions a liquefied material of the green honeycomb molded body 70 may be provided as necessary.

(Ultrasonic Closing Machine)

Figure 3:
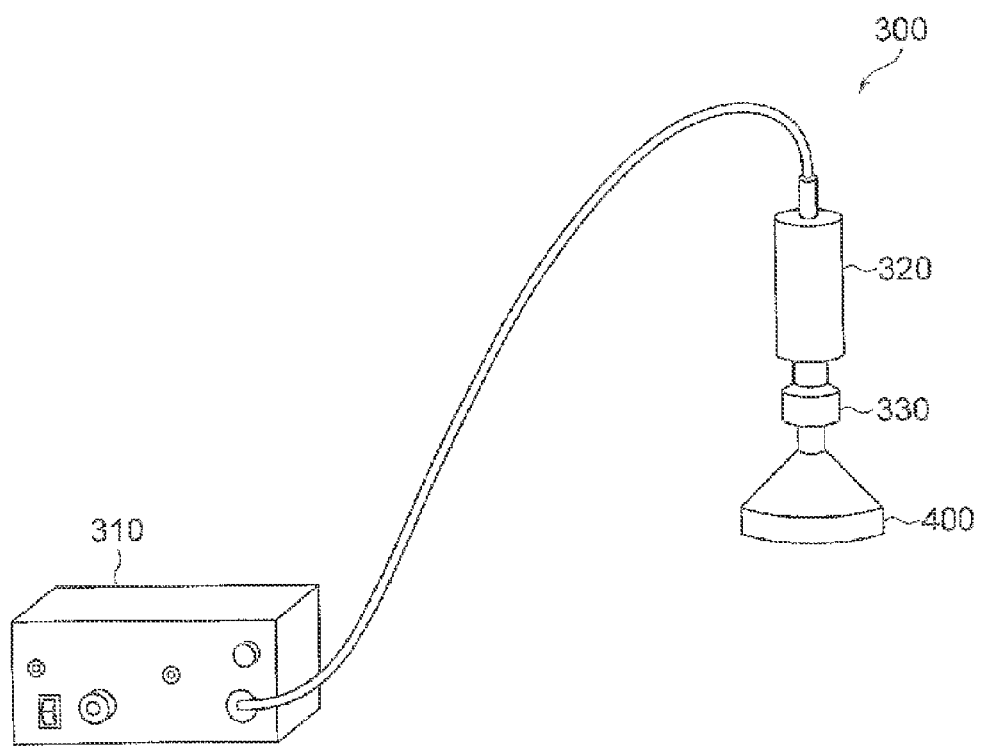
FIG. 3 is a perspective view illustrating a device configured to close the green honeycomb molded body according to the first embodiment.

Hereinafter, an ultrasonic closing machine of this embodiment will be described. As illustrated in FIG. 3, an ultrasonic closing machine 300 of this embodiment includes an ultrasonic signal transmitter 310, an ultrasonic vibrator unit 320, a horn unit 330, and a closing jig 400. As is the case with the ultrasonic cutting machine 200, the ultrasonic signal transmitter 310 transmits an electrical ultrasonic signal. The ultrasonic vibrator unit 320 converts the electrical ultrasonic signal, which is supplied from the ultrasonic signal transmitter 310, to mechanical ultrasonic vibration. The horn unit 330 amplifies the amplitude of the ultrasonic vibration supplied from the ultrasonic vibrator unit 220. The closing jig 400 is vibrated at a frequency of approximately 20 kHz to 40 kHz by the ultrasonic vibration supplied from the horn unit 330.

(Closing Jig)

Hereinafter, a closing jig of this embodiment will be described. In this embodiment, closing of the regular hexagonal cells 70h is performed with aspects different from each other at both end surfaces of the green honeycomb molded body 70 having the regular hexagonal cells 70h. First, description will be given to the closing jig configured to close the top surface 71a which becomes an exhaust gas supply side (inlet side) in a case where the green honeycomb molded body 70 is calcined and is used as a diesel particulate filter.

Figure 4:
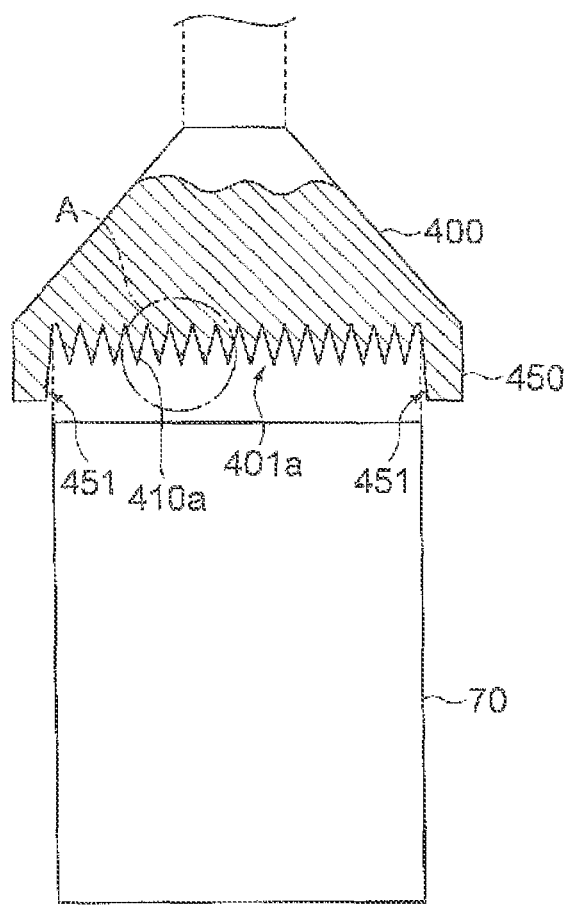
FIG. 4 is a partially cross-sectional view of a closing jig for an inlet side of the green honeycomb molded body having regular hexagonal cells according to the first embodiment.

As illustrated in FIG. 4, the closing jig 400 of this embodiment includes a closing surface 401a that performs closing of the green honeycomb molded body 70, and a support socket portion 450 into which an end of the green honeycomb molded body 70 is fitted. The closing surface 401a is provided with a plurality of closing protrusions 410a which are arranged at positions corresponding parts of the regular hexagonal cells 70h and are inserted into the parts of the regular hexagonal cells 70h to weld the partition walls 70w to each other so as to close the regular hexagonal cells 70h. The support socket portion 450 is formed as a cylindrical concave portion that corresponds to the diameter of the green honeycomb molded body 70 to be closed. An inclined surface 451 is formed on an inner circumferential surface of the support socket portion 450 so as to make insertion of the end of the green honeycomb molded body 70 easy. The more distant from the closing surface 401a, the broader an inner diameter of the support socket portion 450 is.

Figure 5:
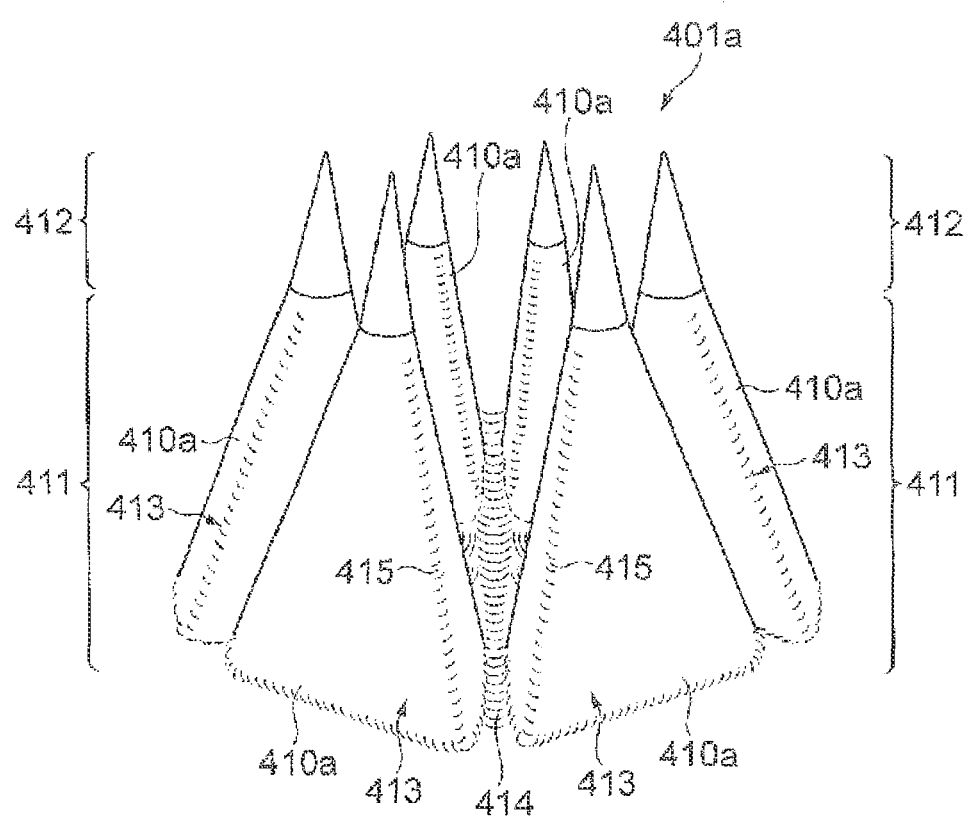
FIG. 5 is an enlarged perspective view of a portion A in FIG. 4.
Figure 6:
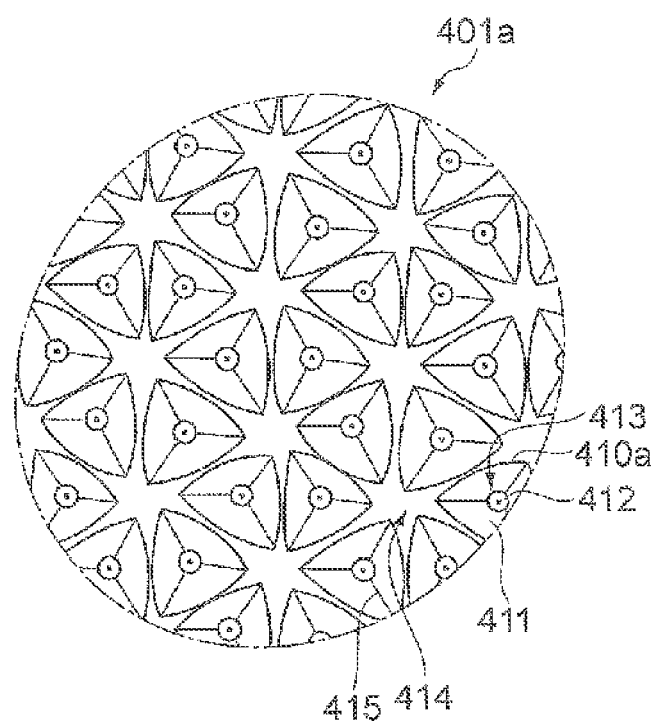
FIG. 6 is an enlarged plan view of the portion A in FIG. 4.
Figure 7:
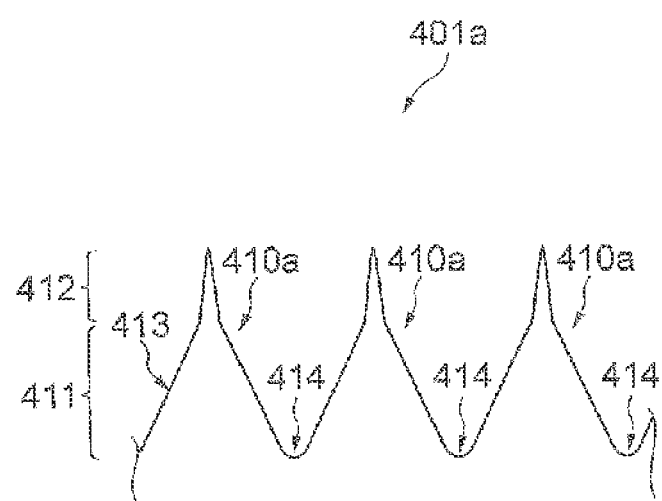
FIG. 7 is an enlarged cross-sectional view of the portion A in FIG. 4.

As illustrated in FIGS. 5 to 7 in which a portion A in FIG. 4 is enlarged, each of closing protrusions 410a includes a triangular pyramidal base portion 411 and a conical tip end portion 412. The triangular pyramidal base portion 411 is located at the base portion of the closing protrusion 410a, and protrudes from the closing surface 401a. The triangular pyramidal base portion 411 has a truncated triangular pyramidal shape obtained by removing a triangular pyramid that is analogously reduced from a triangular pyramid having an apex angle larger than that of the conical tip end portion 412. The conical tip end portion 412 is a tip end portion of the closing protrusion 410a and is located at an upper side of the triangular pyramidal base portion 411. The conical tip end portion 412 has a conical shape having a bottom surface with a size corresponding to the top surface of the triangular pyramidal base portion 411. The apex angle of the conical tip end portion 412 is smaller than an apex angle made by lateral edges of the truncated triangular pyramid that is the triangular pyramidal base portion 411.

The triangular pyramidal base portion 411 includes a triangular pyramid side surface portion 413 that is a side surface of the truncated triangular pyramid, and a round-chamfered lateral edge portion 415 that is a lateral edge of the truncated triangular pyramid. At the round-chamfered lateral edge portion 415, each lateral edge of the truncated triangular pyramid is subjected to round-chamfering with a predetermined curvature. In addition, a valley between the triangular pyramidal base portions 411 of the closing protrusions 410a adjacent to each other includes a round-chamfered valley portion 414 that is a concave portion subjected to round-chamfering with a predetermined curvature.

As illustrated in FIG. 6, in the closing protrusions 410a, the apexes of the conical tip end portions 412 are arranged at positions corresponding to six regular hexagonal cells 70h which are adjacent to the periphery of one regular hexagonal cell 70h among the plurality of regular hexagonal cells 70h of the green honeycomb molded body 70 while centering around the one regular hexagonal cell 70h. In addition, the closing protrusions 410a are arranged in a direction in which the round-chamfered lateral edge portion 415 of the triangular pyramidal base portion 411 comes into contact with the partition walls 70W. The size of the triangular pyramidal base portions 411 is set in such a manner that a length obtained by projecting the round-chamfered lateral edge portion 415 onto the closing surface 401a from an immediately upper side of the closing surface 401a becomes equal to or slightly smaller than a length between opposite sides of each of the regular hexagonal cell 70h of the green honeycomb molded body 70.

Figure 8:
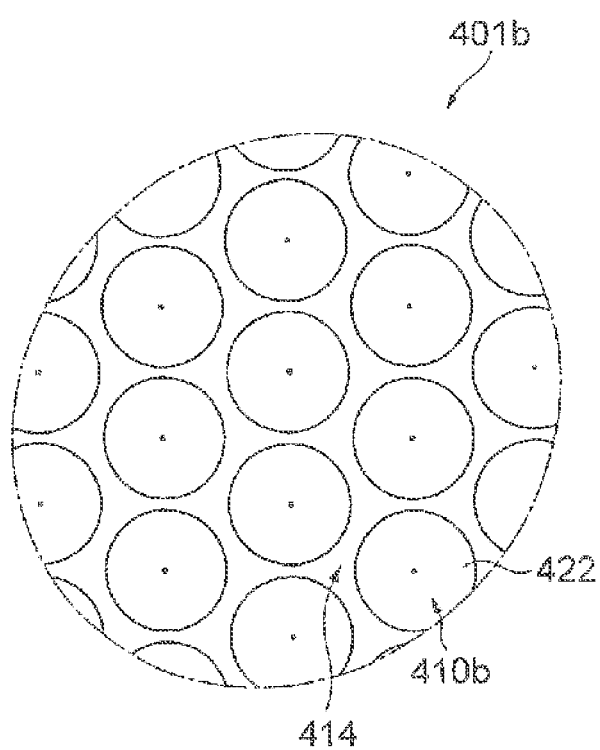
FIG. 8 is an enlarged plan view of a portion, which corresponds to the portion A in FIG. 4, of a closing jig for an outlet side of the green honeycomb molded body having the regular hexagonal cells according to the first embodiment.

On the other hand, description will be given to the closing jig 400 configured to close the bottom surface 71b which becomes an exhaust gas discharging side (outlet side) in a case where the green honeycomb molded body 70 is calcined and is used as the diesel particulate filter. As illustrated in FIG. 8, a closing surface 401b configured to close the bottom surface 71b is provided with a conical closing protrusion 410b. The closing protrusion 410b includes a conical side surface portion 422. As is the case with the closing surface 401a, a valley between closing protrusions 410b adjacent to each other includes a round-chamfered valley portion 414 that is a concave portion subjected to round-chamfering with a predetermined curvature.

As illustrated in FIG. 8, in the closing protrusions 410b, each of the apexes thereof is arranged at a position corresponding to one regular hexagonal cell 70h surrounded by six regular hexagonal cells 70h adjacent to each other among the plurality of regular hexagonal cells 70h of the green honeycomb molded body 70. The one regular hexagonal cell 70h located at a position, to which each of the closing protrusions 410b corresponds, is one regular hexagonal cell 70h surrounded by six adjacent regular hexagonal cells 70h to which the closing protrusions 410a correspond at the top surface 71a.

Accordingly, at the top surface 71a, the closing protrusions 410a are inserted into the six regular hexagonal cells 70h which are adjacent to the periphery of the one regular hexagonal cell 70h while centering around the one regular hexagonal cell 70h. In the bottom surface 71b, the closing protrusion 410b is inserted into the one regular hexagonal cell 70h surrounded by the adjacent six regular hexagonal cells 70h into which the closing protrusions 410a are inserted at the top surface 71a. The size of the closing protrusion 410b is set in such a manner that a radius of the bottom surface of the closing protrusion 410b becomes equal to or slightly smaller than a length between opposite sides of the regular hexagonal cell 70h of the green honeycomb molded body 70.

(Cutting Step)

Figure 9:
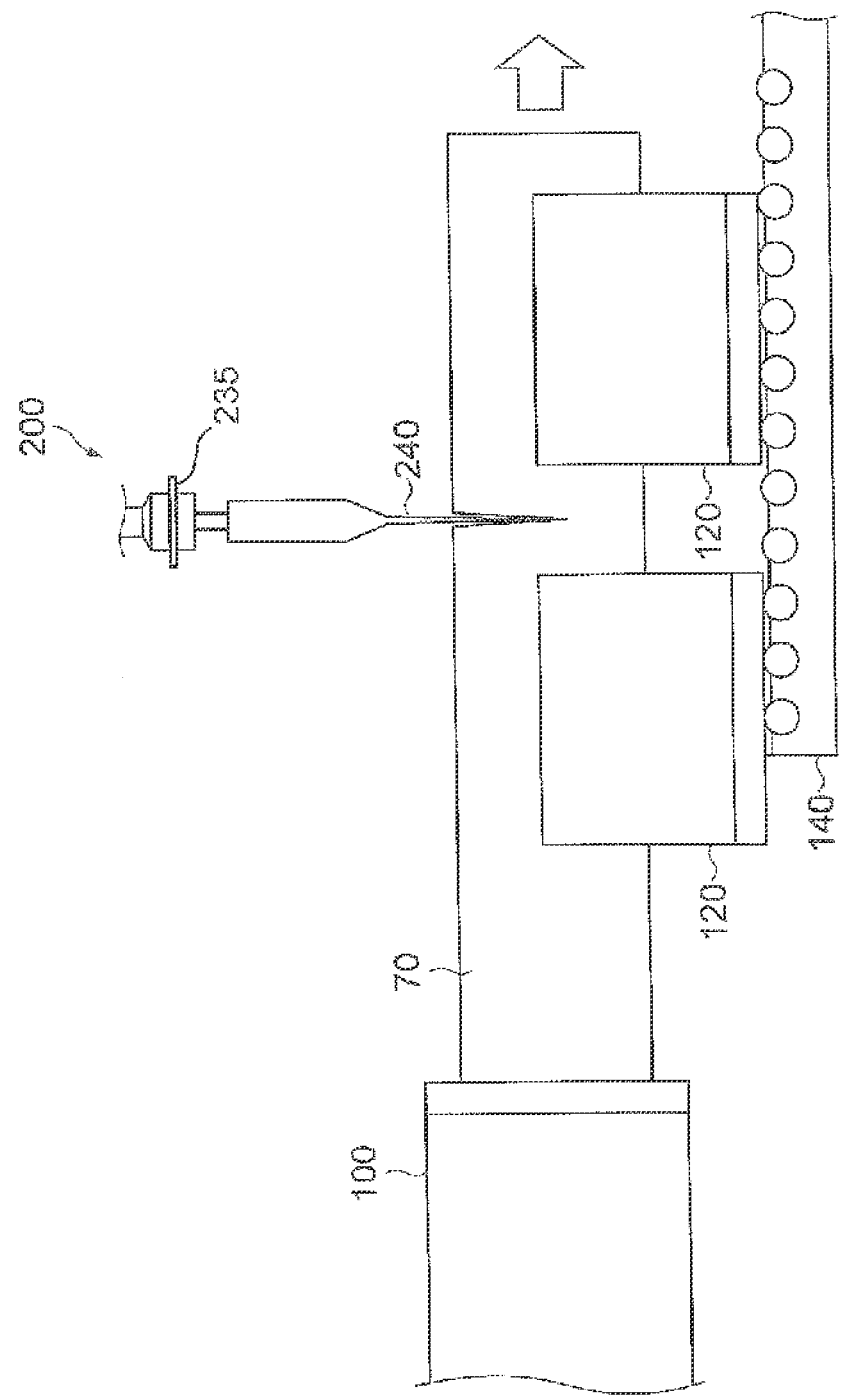
FIG. 9 is a side view illustrating a step of cutting out the green honeycomb molded body according to the first embodiment.

Hereinafter, a step of cutting out the green honeycomb molded body 70 of this embodiment will be described. As illustrated in FIG. 9, the green honeycomb molded body 70 according to this embodiment is prepared by extruding the raw material mixture prepared as described above from an extrusion molding machine 100 having outlet openings which correspond to a cross-sectional shape of the partition walls 70W.

The green honeycomb molded body 70, which is extruded, is supported by a flexible stand 120 such as a sponge whenever the green honeycomb molded body 70 is extruded for a predetermined length. Each stand 120 that supports the green honeycomb molded body 70 is sequentially conveyed on a roller conveyor 140 in a direction in which the green honeycomb molded body 70 is extruded. The green honeycomb molded body 70 that is conveyed is cut out in a predetermined length to have the top surface 71a and the bottom surface 71b which are perpendicular to the side surface 71*c* by using the cutting blade 240 that is vibrated with ultrasonic waves of the ultrasonic cutting machine 200.

(Closing Step)

Hereinafter, a step of closing the green honeycomb molded body 70 of this embodiment will be described. First, description will be given to a step of closing the top surface 71*a* which becomes an exhaust gas supply side (inlet side) in a case where the green honeycomb molded body 70 is calcined and is used as the diesel particulate filter.

Figure 10:
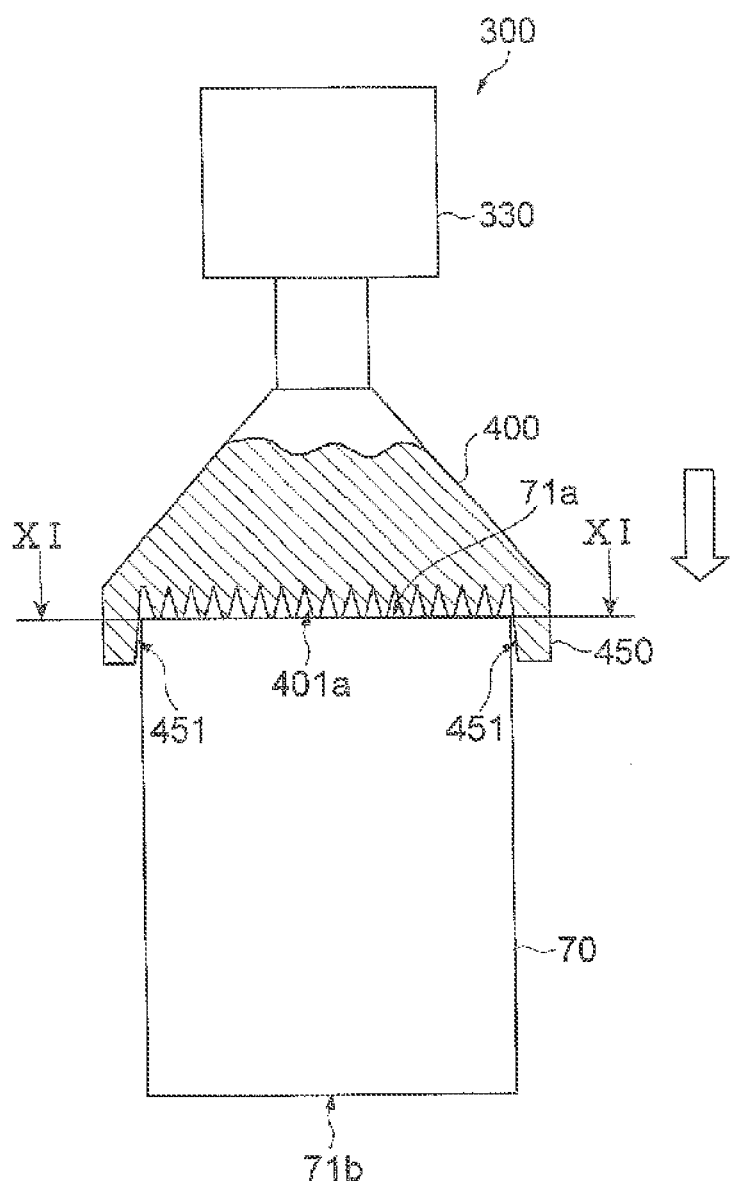
FIG. 10 is a partially cross-sectional view illustrating an initial state of a step of closing an inlet side of the green honeycomb molded body having the regular hexagonal cells according to the first embodiment.
Figure 11:
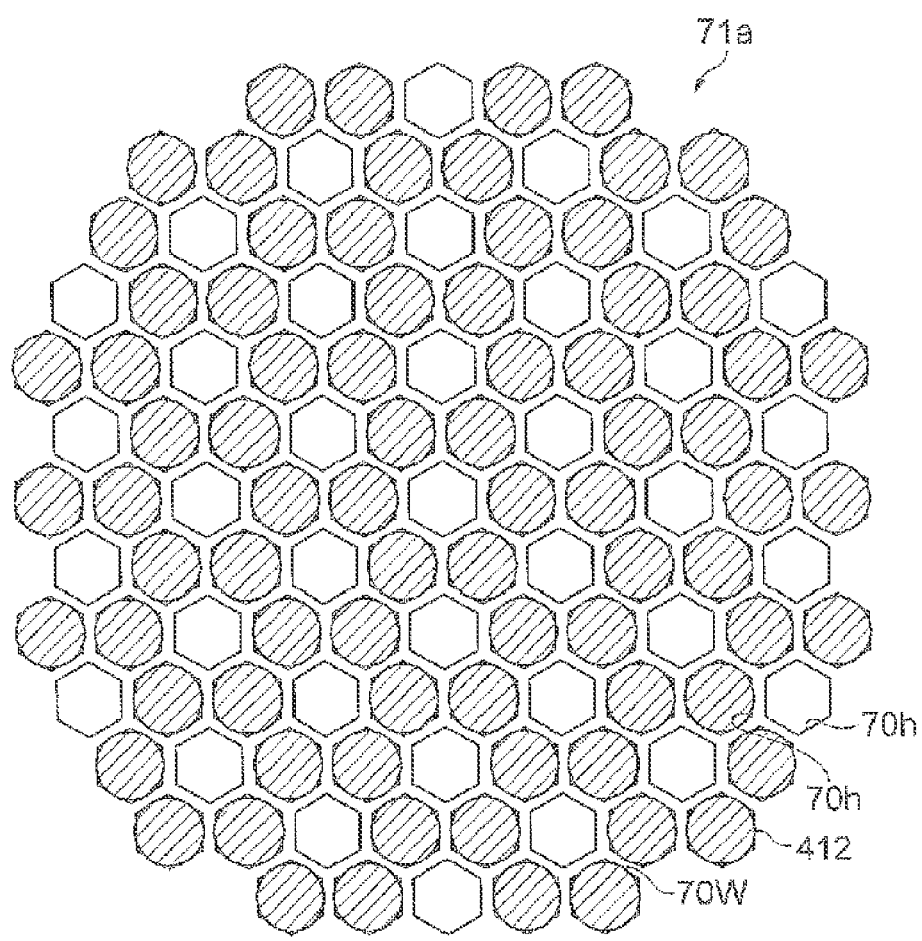
FIG. 11 is a cross-sectional view taken along line XI-XI in FIG. 10.

As illustrated in FIG. 10, an end on a top surface 71*a* side of the green honeycomb molded body 70 is inserted into the support socket portion 450 of the closing jig 400 of the ultrasonic closing machine 300. The closing jig 400 is vibrated with ultrasonic vibration from the horn unit 330. The tip ends of the closing protrusions 410*a* of the closing surface 401*a* are inserted into parts of the regular hexagonal cell 70*h*. As illustrated in FIG. 11, the conical tip end portions 412 of the closing protrusions 410*a* are inserted into six regular hexagonal cells 70*h* which are adjacent to the periphery of one regular hexagonal cell 70*h* while centering around the one regular hexagonal cell 70*h*.

Figure 12:
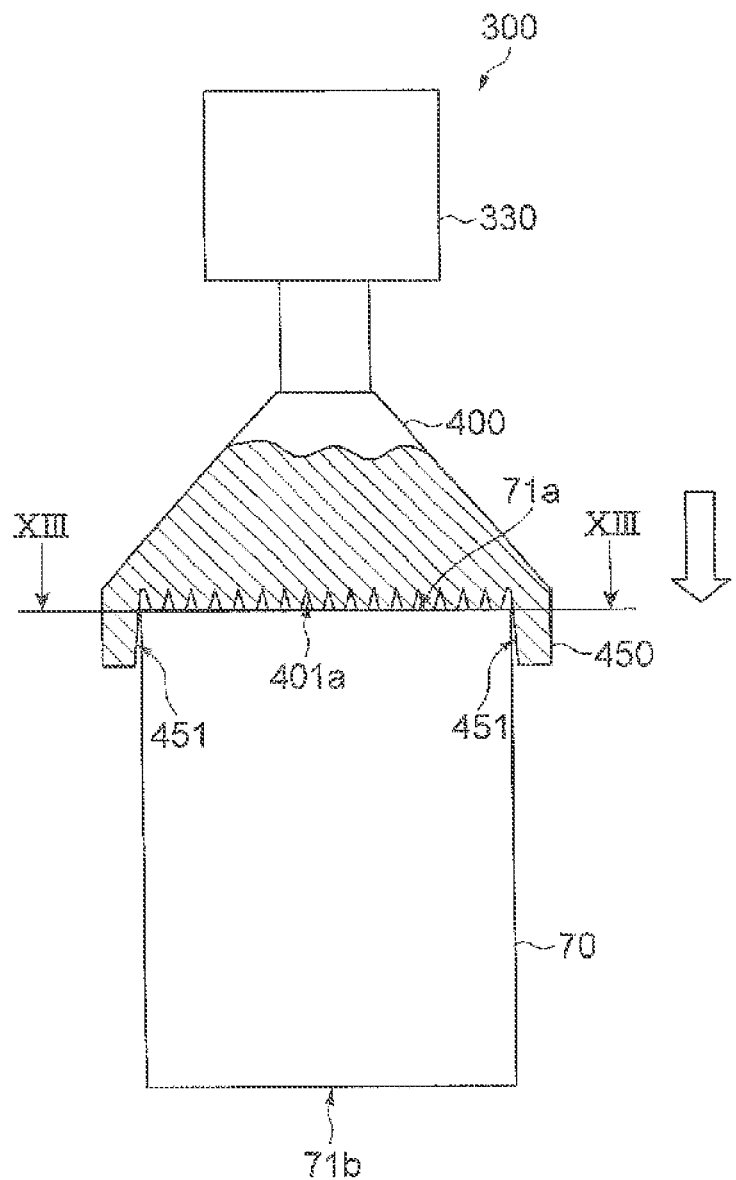
FIG. 12 is a partially cross-sectional view illustrating an intermediate state of the closing step in FIG. 10.
Figure 13:
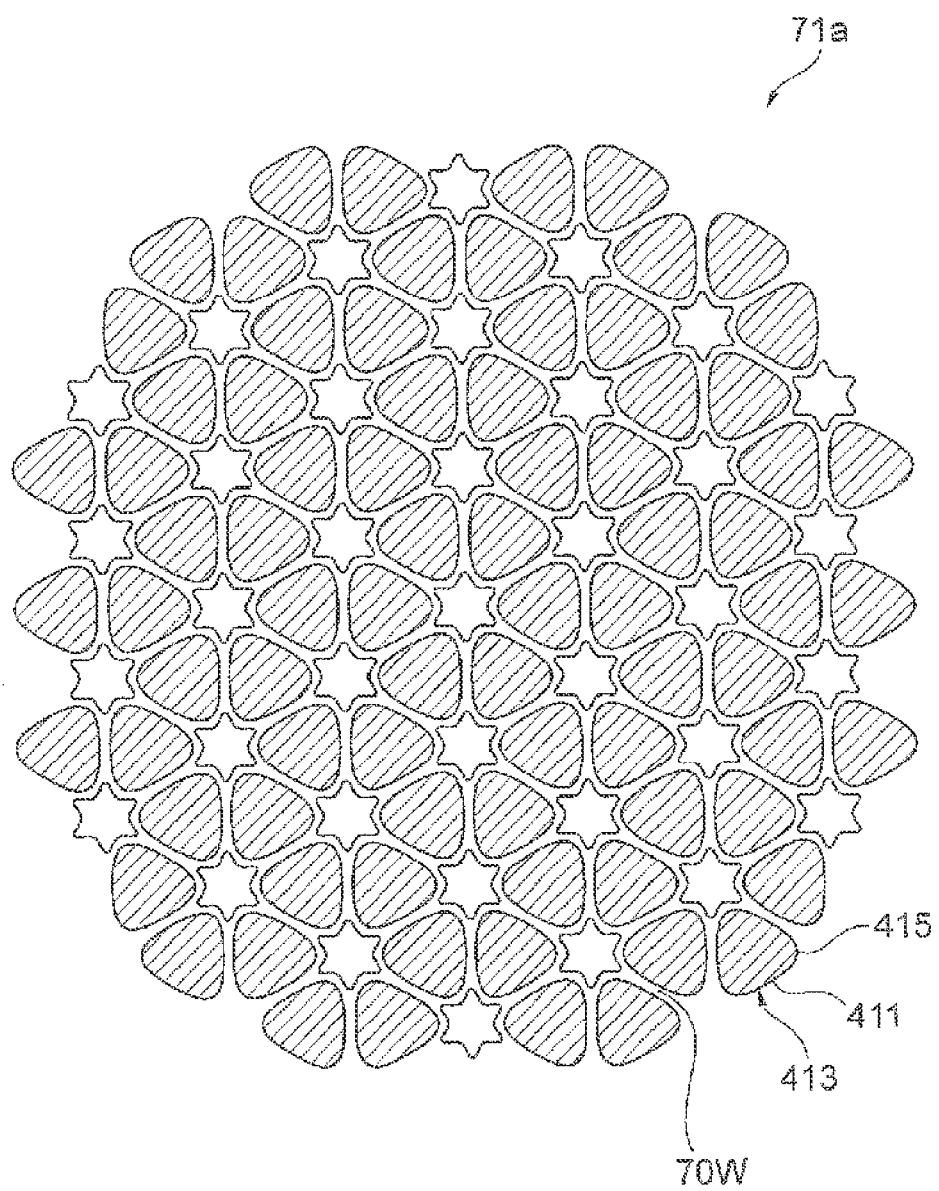
FIG. 13 is a cross-sectional view taken along line XIII-XIII in FIG. 12.

As illustrated in FIG. 12, when the closing protrusions 410*a* are further inserted into the regular hexagonal cells 70*h*, as illustrated in FIG. 13, the triangular pyramidal base portions 411 of the closing protrusions 410*a* are inserted into the regular hexagonal cells 70*h*. The round-chamfered lateral edge portions 415 of the triangular pyramidal base portions 411 come into contact with the partition walls 70W. Since the closing protrusions 410*a* are vibrated with the ultrasonic vibration, the partition walls 70W liquefy and are pressed to close the regular hexagonal cell 70*h* into which the closing protrusion 410*a* is not inserted and which is located at the center of the six regular hexagonal cells 70*h* into which the closing protrusions 410*a* are inserted, respectively.

Figure 14:
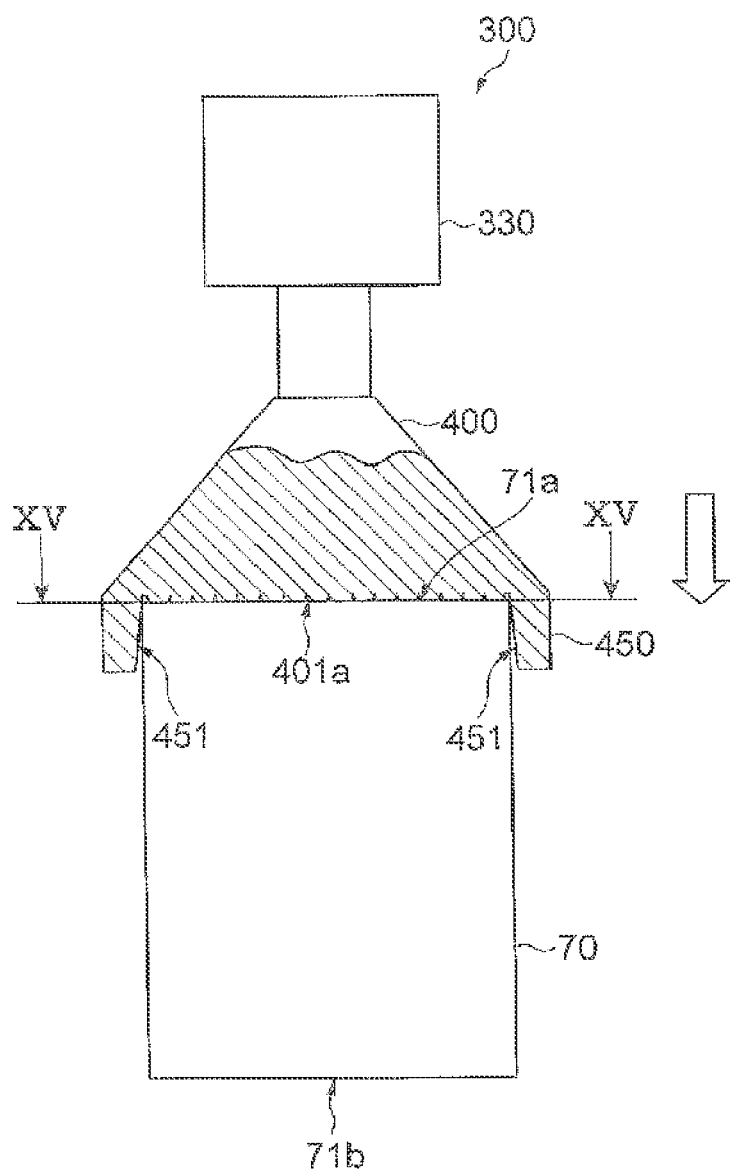
FIG. 14 is a partially cross-sectional view illustrating a final state of the closing step in FIG. 10.
Figure 15:
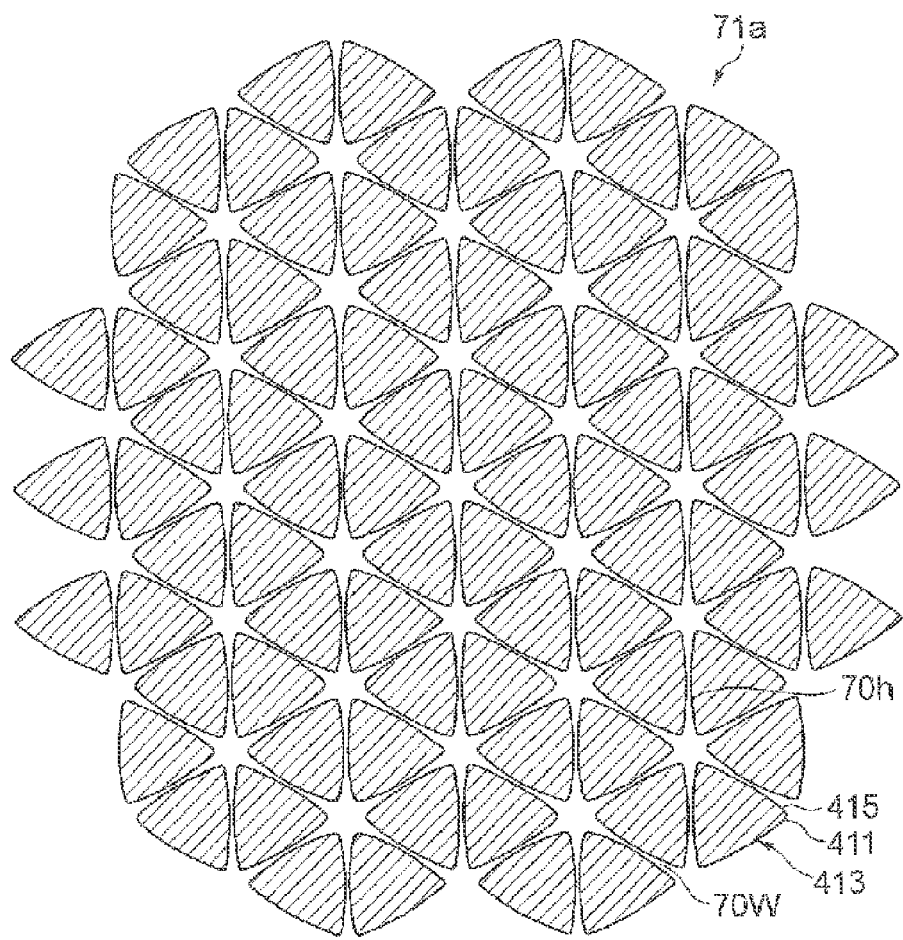
FIG. 15 is a cross-sectional view taken along line XV-XV in FIG. 14.

As illustrated in FIG. 14, when the closing protrusions 410*a* are further inserted into the regular hexagonal cells 70*h*, as illustrated in FIG. 15, the partition walls 70W, which are pressed from six directions while liquefying due to the round-chamfered lateral edge portion 415 and the triangular pyramid side surface portion 413 of the triangular pyramidal base portion 411, are integrally welded. The end of the welded partition walls 70W is brought into contact with the round-chamfered valley portion 414 of the closing surface 401*a*, and closing is completed in a state in which the end is subjected to round-chamfering corresponding to a shape of the round-chamfered valley portion 414. According to this, at the top surface 71*a* that becomes an exhaust gas supply side (inlet side), the one regular hexagonal cell 70*h*, which is surrounded by the six regular hexagonal cells 70*h* adjacent to the periphery of the one regular hexagonal cell 70*h*, is closed.

Figure 16:
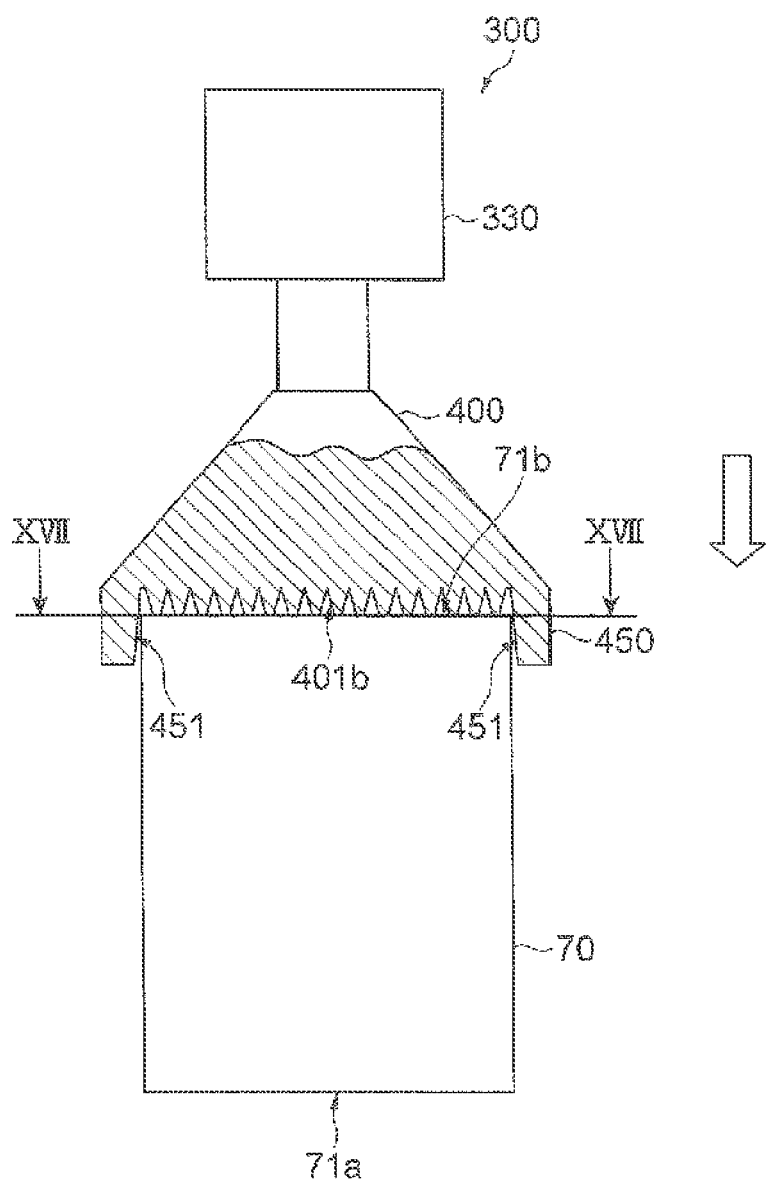
FIG. 16 is a partially cross-sectional view illustrating an initial state of a step of closing an outlet side of the green honeycomb molded body having the regular hexagonal cells according to the first embodiment.
Figure 17:
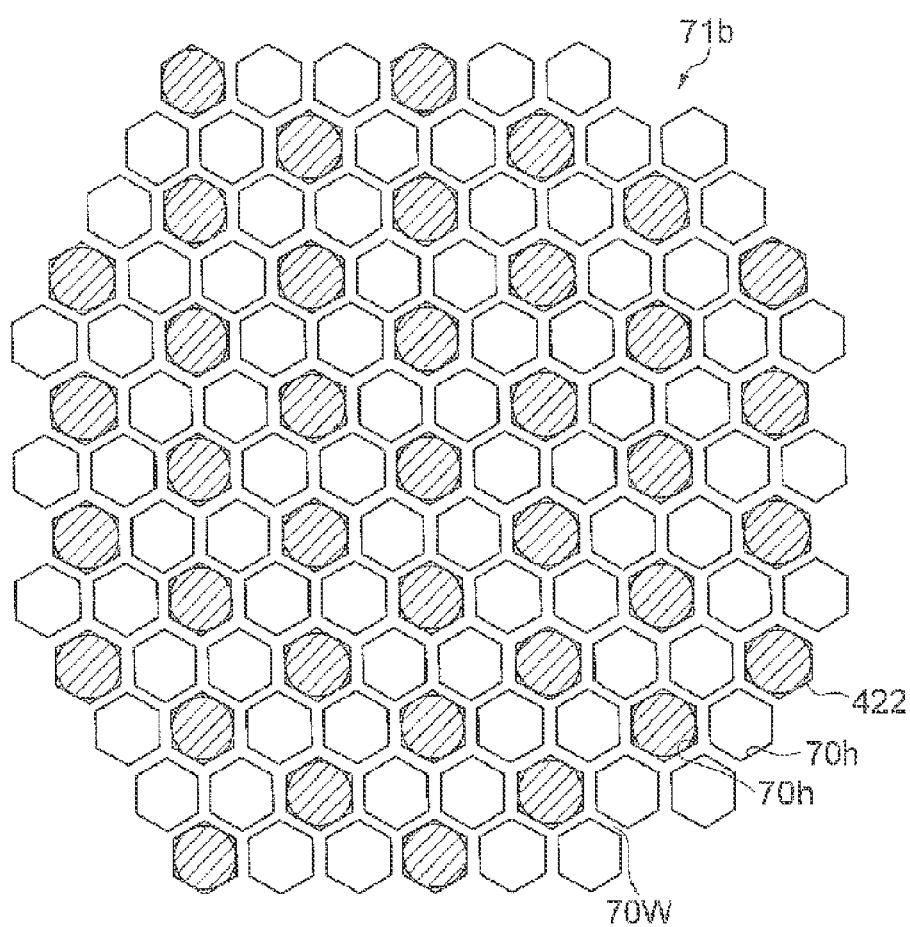
FIG. 17 is a cross-sectional view taken along line XVIII-XVIII in FIG. 16.

Next, description will be given to a step of closing the bottom surface 71*b* which becomes an exhaust gas discharging side (outlet side) in a case where the green honeycomb molded body 70 is calcined and is used as the diesel particulate filter. As illustrated in FIG. 16, an end on a bottom surface 71*b* side of the green honeycomb molded body 70 is inserted into the support socket portion 450 of the closing jig 400 of the ultrasonic closing machine 300. The closing jig 400 is vibrated with ultrasonic vibration from the horn unit 330. The tip ends of the closing protrusions 410*b* of the closing surface 401*b* are inserted into parts of the regular hexagonal cells 70*h*. As illustrated in FIG. 17, each of the closing protrusions 410*b* is inserted into one hexagonal cell 70*h* surrounded by six regular hexagonal cells 70*h* which are adjacent to each other. As described above, at the bottom surface 71*b*, the regular hexagonal cell 70*h* into which the closing protrusion 410*b* is inserted is the regular hexagonal cell 70*h* into which the closing protrusion 410*a* is not inserted at the top surface 71*a*.

Figure 18:
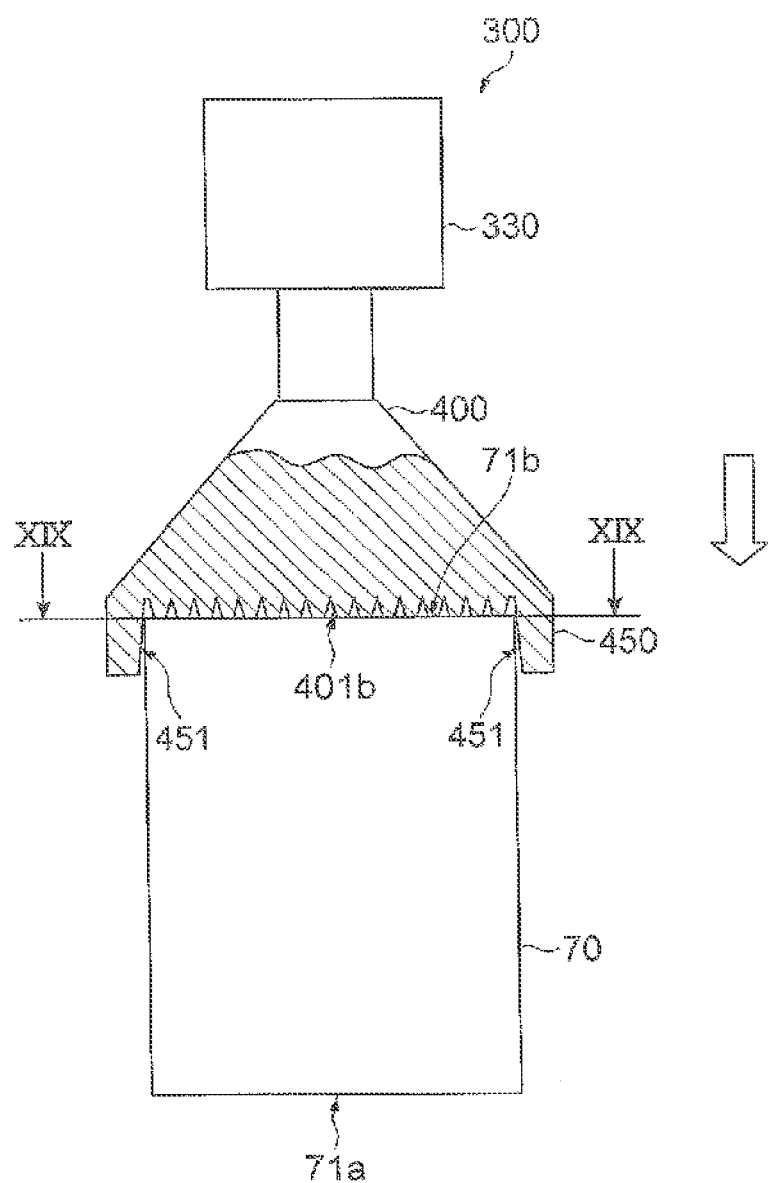
FIG. 18 is a partially cross-sectional view illustrating an intermediate state of the closing step in FIG. 16.
Figure 19:
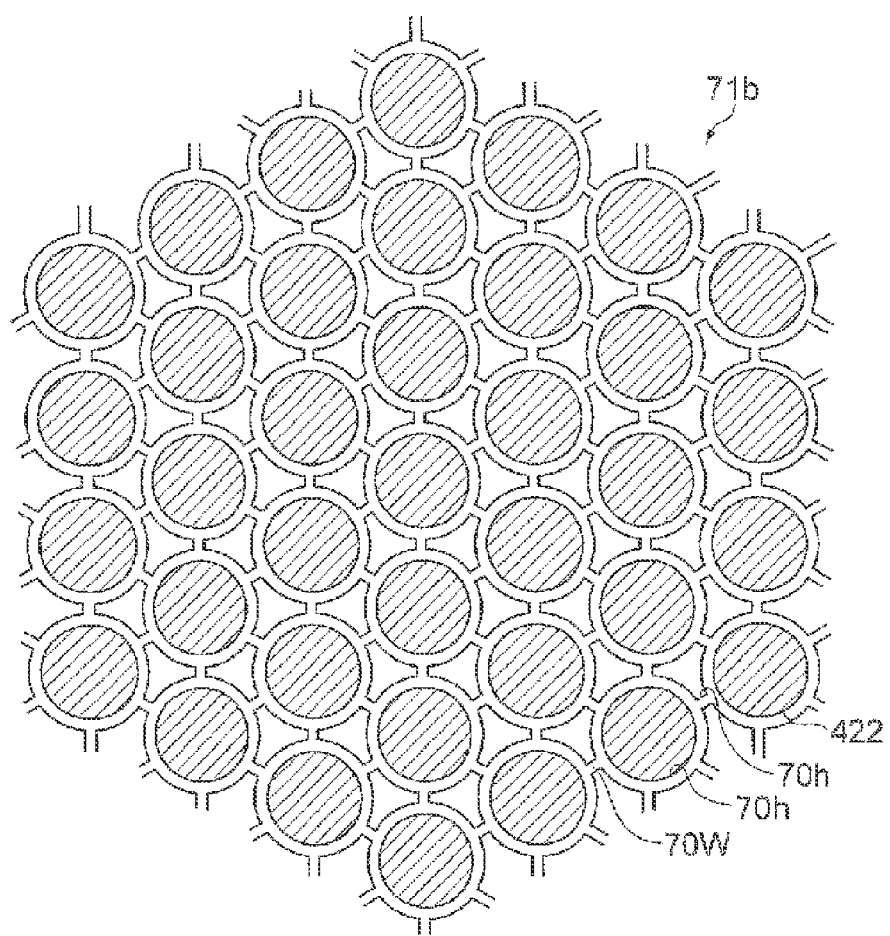
FIG. 19 is a cross-sectional view taken along line XIX-XIX in FIG. 18.

As illustrated in FIG. 18, when the closing protrusion 410*b* is further inserted into the regular hexagonal cell 70*h*, as illustrated in FIG. 19, a conical side surface portion 422 of the closing protrusion 410*b* comes into contact with the partition walls 70W. The closing protrusion 410*b* is vibrated with ultrasonic vibration, and thus the partition walls 70W liquefy and are pressed to close the regular hexagonal cell 70*h* into which the closing protrusion 410*b* is not inserted and which is located at the center of a plurality of the regular hexagonal cells 70*h* into which the closing protrusion 410*b* is inserted.

Figure 20:
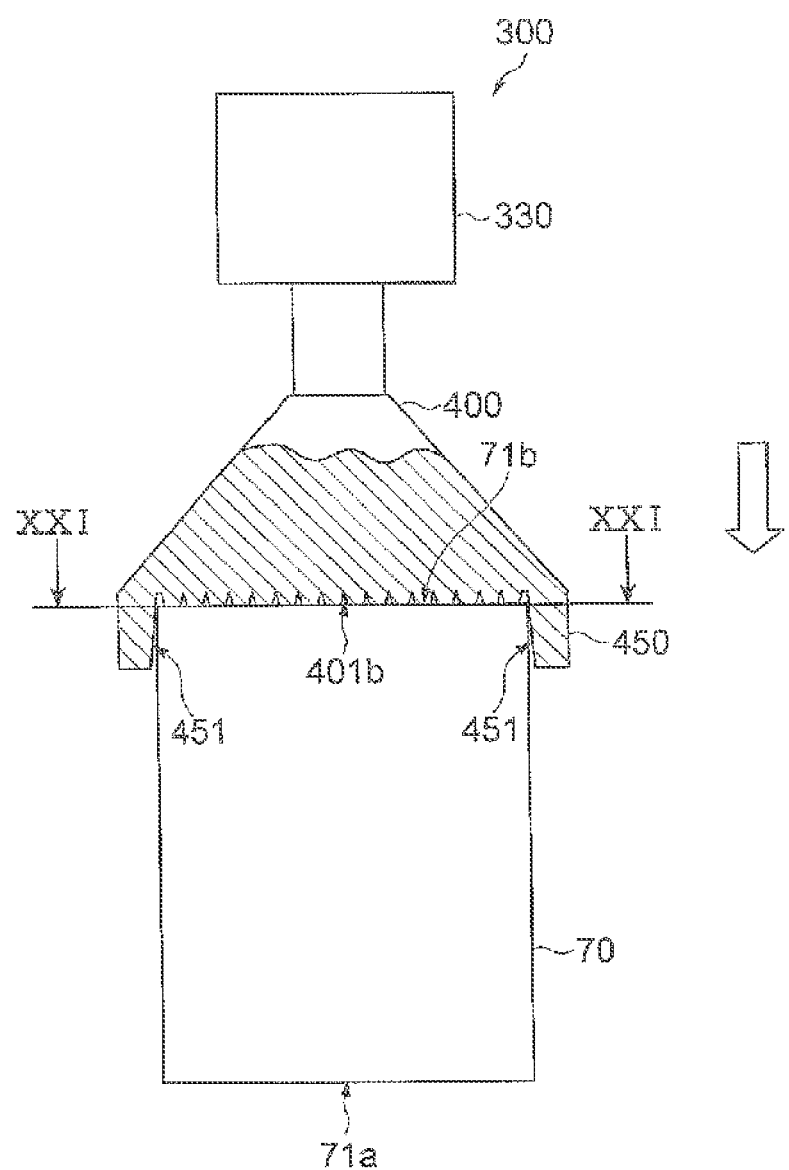
FIG. 20 is a partially cross-sectional view illustrating a final state of the closing step in FIG. 16.
Figure 21:
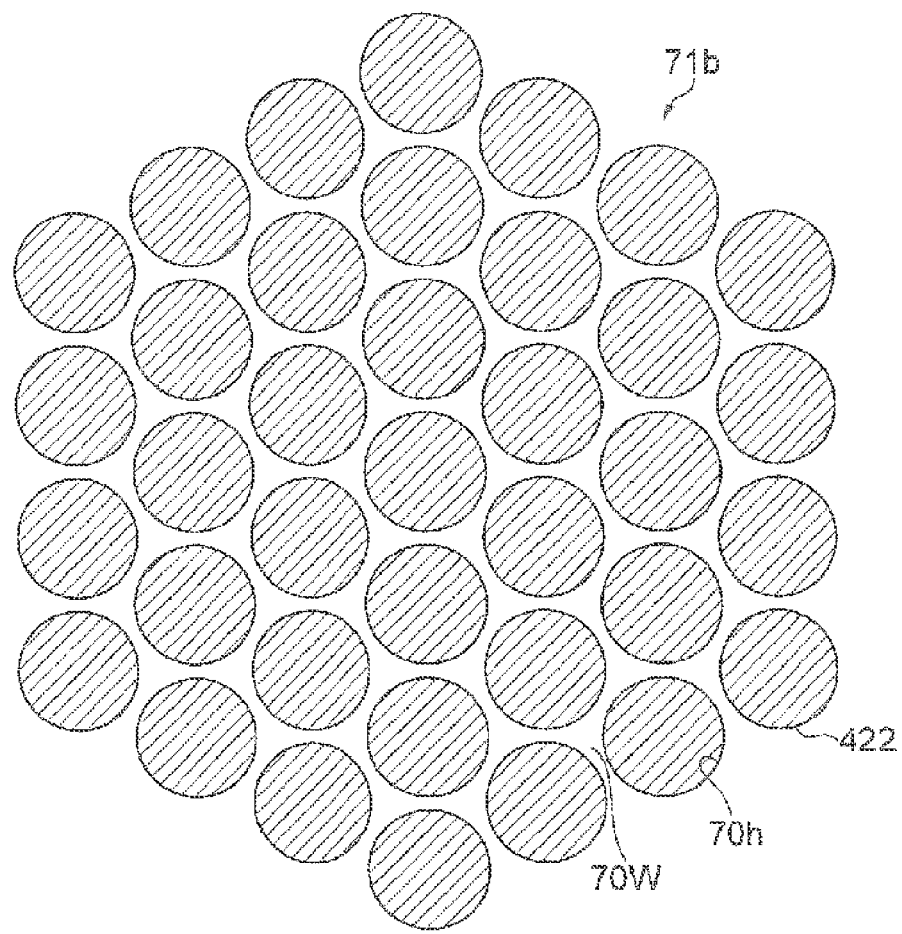
FIG. 21 is a cross-sectional view taken along line XXI-XXI in FIG. 20.

As illustrated in FIG. 20, when the closing protrusion 410*b* is further inserted into the regular hexagonal cell 70*h*, as illustrated in FIG. 21, the partition walls 70W, which are pressed while liquefying due to the conical side surface portion 422 of the closing protrusion 410*b*, are integrally welded. The end of the welded partition walls 70W is brought into contact with the round-chamfered valley portion 414 of the closing surface 401*b*, and closing is completed in a state in which the end is subjected to round-chamfering corresponding to a shape of the round-chamfered valley portion 414. According to this, at the bottom surface 71*b* that becomes an exhaust gas discharging side (outlet side), the six regular hexagonal cells 70*h*, which are adjacent to the periphery of the one regular hexagonal cell 70*h* closed at the top surface 71*a*, are closed.

In addition, in this embodiment, since ultrasonic waves are locally used to the green honeycomb molded body 70 which becomes the honeycomb structure when being calcined, the green honeycomb molded body 70 is processed in a state in which the green honeycomb molded body 70 locally liquefies. According to this, a cutting stock is less likely to occur during a cutting process and the like, and thus it is possible to improve a yield rate. In addition, fuzz and the like are less likely to occur in a processing surface, and the processing surface becomes satisfactory.

In addition, in this embodiment, the cutting blade 240, which is vibrated with ultrasonic waves, is brought into contact with the green honeycomb molded body 70 immediately after extrusion-molded from the raw material to cut out the green honeycomb molded body 70 at an end surface. When the cutting blade 240 that is vibrated with ultrasonic waves is brought into contact with the green honeycomb molded body 70, the green honeycomb molded body 70 liquefies. Accordingly, a cutting stock accompanying the cutting is less likely to occur, and thus it is possible to improve a yield rate. In addition, fuzz and the like are less likely to occur in a cutting surface, and the cutting surface becomes smooth. As a result, it is possible to prevent cell twisting which collapses the shape of the regular hexagonal cell 70*h*. Furthermore, the cutting surface of the green honeycomb molded body 70 during the cutting step can be set as the top surface 71*a* and the bottom surface 71*b* which are end surfaces of the honeycomb structure after calcining. In this case, it is possible to omit a step of accurately cutting out the green honeycomb molded body 70 which is dried with microwaves and the like after being extrusion-molded from the raw material like the related art.

In addition, in this embodiment, the closing jig 400 that is vibrated with ultrasonic waves is inserted into parts of the plurality of regular hexagonal cells 70*h* of the green honeycomb molded body 70 immediately after being extrusion-molded from the raw material and being cut out to have a predetermined length, and thus the partition walls 70W are welded to each other to close the regular hexagonal cells 70*h*.

The green honeycomb molded body 70 is closed, and thus shrinkage due to drying or calcining, which can be seen in a case where the green honeycomb molded body 70 is closed after being dried or calcined like a method of the related art, does not occur. As a result, it is possible to prevent cell twisting. In addition, when the closing protrusions 410a, which are vibrated with ultrasonic waves, are inserted into the regular hexagonal cells 70h, the partition walls 70W liquefy. Accordingly, fuzz and the like are less likely to occur in a processing surface, and the processing surface becomes satisfactory. As a result, ends of the partition walls 70W are reliably welded to each other, and thus it is possible to prevent an omission in closing. In addition, the partition walls 70W are welded to each other to close the regular hexagonal cells 70h, and thus closing paste like the method of the related art is not necessary. Furthermore, since the partition walls 70w are welded to each other to close the regular hexagonal cells 70h, in a case where the honeycomb structure is used as the diesel particulate filter, turbulence in the flow of an exhaust gas is less likely to occur at an end surface on an exhaust gas supply side, and thus it is possible to reduce a pressure drop.

In addition, in this embodiment, the closing jig 400, which is configured to close the green honeycomb molded body 70 that becomes the honeycomb structure after being calcined, includes the plurality of closing protrusions 410a which are arranged at positions corresponding to parts of the plurality of regular hexagonal cells 70h and are inserted into the parts of the plurality of regular hexagonal cells 70h to weld the partition walls 70w to each other so as to close the regular hexagonal cells 70h. Each of the closing protrusions 410a includes the conical tip end portion 412 which is located at the tip end portion of the closing protrusion 410a and has a conical shape, and the triangular pyramidal base portion 411 which is located at the base portion of the closing protrusion 410a, and has a truncated triangular pyramidal shape obtained by removing a triangular pyramid which is analogously reduced from a triangular pyramid having an apex angle larger than an apex angle of the conical tip end portion 412. The conical tip end portion 412 has the conical shape with an acute apex angle, and thus even when positional deviation slightly occurs in the regular hexagonal cells 70h of the green honeycomb molded body 70, it is easy to insert the conical tip end portion 412 into each of the regular hexagonal cells 70h. In addition, the triangular pyramidal base portion 411 has the truncated triangular pyramidal shape obtained by removing the pyramid which is analogously reduced from the pyramid having the apex angle larger than the apex angle of the conical tip end portion 412, and thus it becomes easier to weld the partition walls 70W to each other by pressing and expanding the partition walls 70W at the triangular pyramid side surface portion 413 or the round-chamfered lateral edge portion 415. Accordingly, it is possible to close the green honeycomb molded body 70 in a relatively efficient manner.

In addition, in this embodiment, each lateral edge of the triangular pyramidal base portion 411 is the round-chamfered lateral edge portion 415 that is subjected to round-chamfering with a predetermined curvature. Accordingly, it is possible to prevent the partition walls of the green honeycomb molded body from being cut out due to the lateral edge of the triangular pyramidal base portion 411. Particularly, in this embodiment, the closing protrusions 410a, which are vibrated with ultrasonic waves, are inserted in the regular hexagonal cells 70h, and thus when the lateral edge is round-chamfered, it is possible to effectively prevent the partition wall 70W from being cut out.

In addition, in this embodiment, the valley between the triangular pyramidal base portions 411 of the closing protrusions 410a adjacent to each other is the round-chamfered valley portion 414 that is subjected to round-chamfering with a predetermined curvature. Accordingly, ends of the partition walls 70W which are welded to each other by the closing protrusions 410a are round-chamfered, and thus the ends of the partition walls 70W are reliably welded to each other, and thus an omission in closing is prevented. In addition, in the case of using the honeycomb structure as the diesel particulate filter, turbulence in the flow of an exhaust gas is less likely to occur at an end surface on an exhaust gas supply side, and thus it is possible to reduce a pressure drop.

In addition, in this embodiment, the closing protrusions 410a are arranged at positions corresponding to six regular hexagonal cells 70h which are adjacent to the periphery of one regular hexagonal cell 70h among the plurality of regular hexagonal cells 70h having a hexagonal shape while centering around the one regular hexagonal cell 70h, the triangular pyramidal base portion 411 has the truncated triangular pyramidal shape obtained by removing a triangular pyramid that is analogously reduced from a triangular pyramid having an apex angle larger than an apex angle of the conical tip end portion 412, and the round-chamfered lateral edge portions 415 of the triangular pyramidal base portion 411 come into contact with the partition walls 70W.

According to this, the closing protrusions 410a are inserted into the six regular hexagonal cells 70h which are adjacent to the periphery of the one regular hexagonal cell 70h while centering around the one regular hexagonal cell 70h. In addition, the regular hexagonal cell 70h located at the center of the six regular hexagonal cells 70h is pressed by the round-chamfered lateral edge portions 415 of the triangular pyramidal base portions 411 in the closing protrusions 410a which are inserted, and the partition walls 70W are welded to each other to close the central regular hexagonal cell 70h. According to this, for example, in the case of using the honeycomb structure as the diesel particulate filter, it is possible to efficiently perform closing on an exhaust gas supply side.

[Second Embodiment]

(Green Honeycomb Molded Body (Square Cell))

Figure 22:
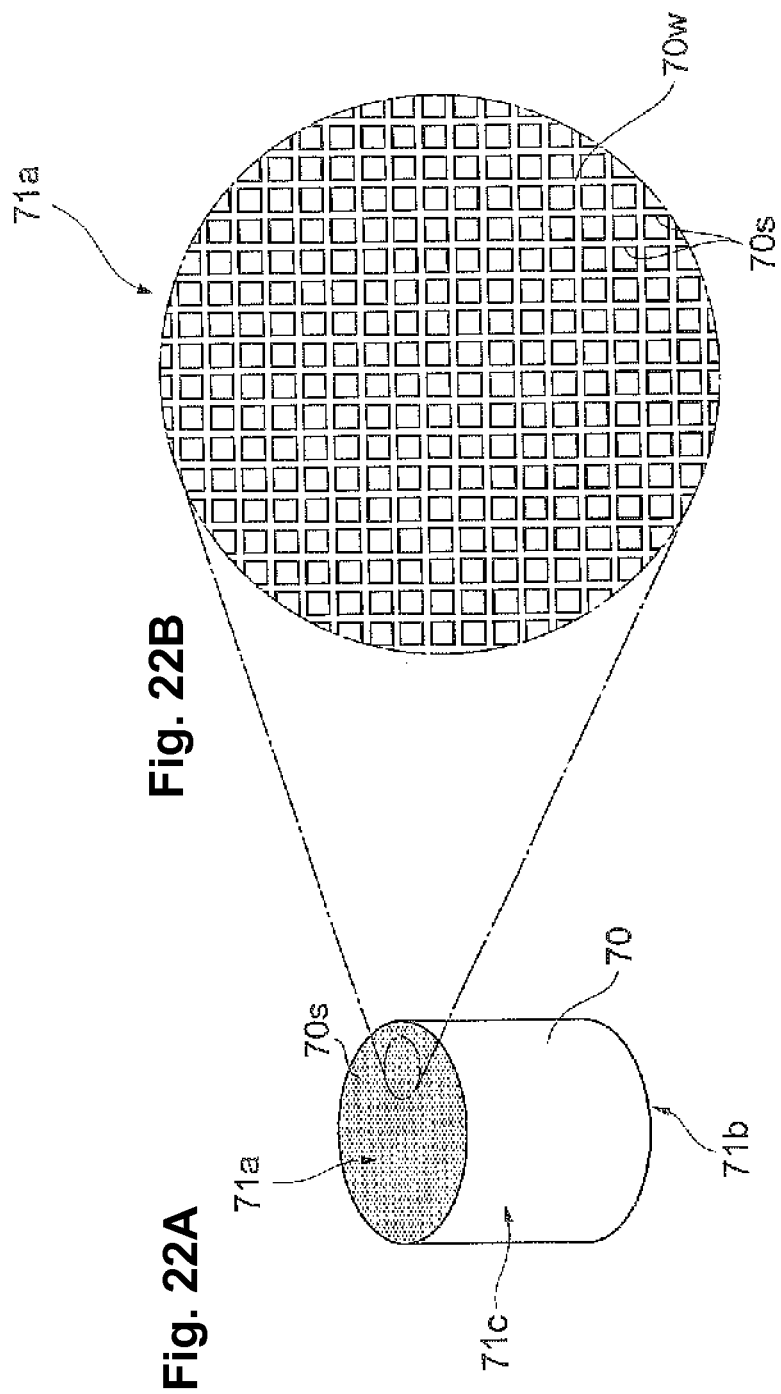
FIG. 22A is a perspective view of a green honeycomb molded body having square cells before closing.
FIG. 22B is a partially enlarged view of A.

Hereinafter, a second embodiment of the invention will be described. First, description will be given to a green honeycomb molded body that is an object to be processed in the second embodiment of the invention. As illustrated in FIGS. 22A and 22B, for example, a green honeycomb molded body 70 according to this embodiment is a cylindrical body having a top surface 71a, a bottom surface 71b, and a side surface 71c. Square cells 70s, which are a plurality of through-holes having a square shape, are arranged in the top surface 71a and the bottom surface 71b in an approximately parallel manner. The green honeycomb molded body 70 is a non-calcined molded body which becomes a porous ceramics after being subjected to subsequent calcining. A configuration or a producing method other than the square cells 70s are the same as in the green honeycomb molded body 70 having the regular hexagonal cells 70h. The square cells 70s are partitioned by partition walls 70w. The thickness of the partition walls 70w may be set, for example, to 0.15 mm to 0.76 mm. The size of one side of the square cells 70s may be set, for example, to 0.8 mm to 2.5 mm.

(Closing Jig)

Hereinafter, a closing jig of this embodiment will be described. In this embodiment, closing of the square cells 70s is performed with the same aspect at both end surfaces of the green honeycomb molded body 70 having the square cells 70s. First, description will be given to the closing jig configured to close the top surface 71a which becomes an exhaust gas supply side (inlet side) in a case where the green honeycomb molded body 70 is calcined and is used as a diesel particulate filter.

Figure 23:
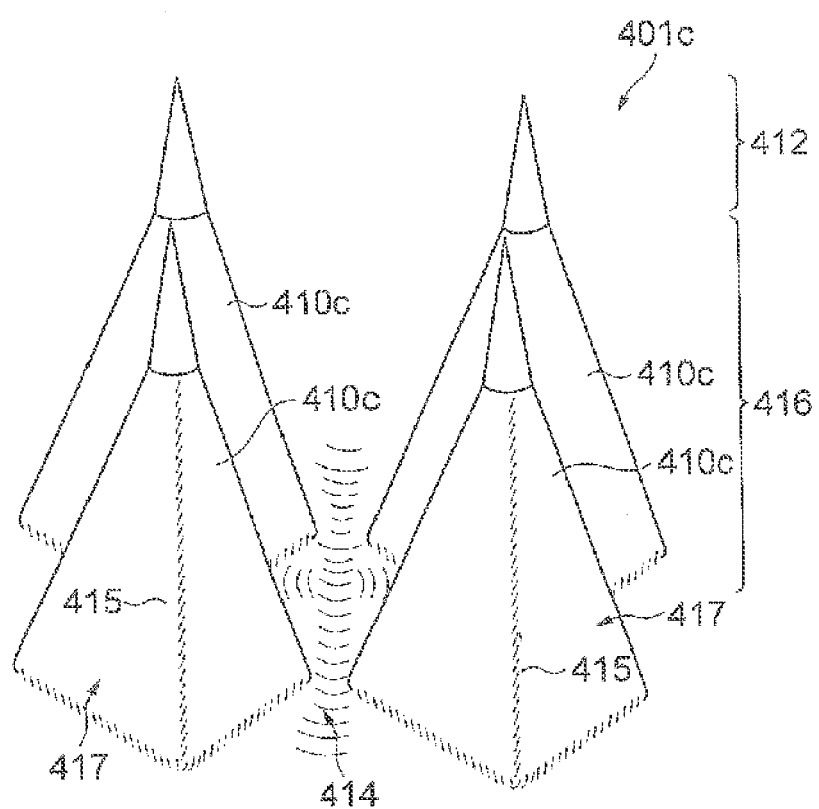
FIG. 23 is an enlarged perspective view of a portion, which corresponds to the portion A in FIG. 4, of a closing jig for a green honeycomb molded body having square cells according to a second embodiment.
Figure 24:
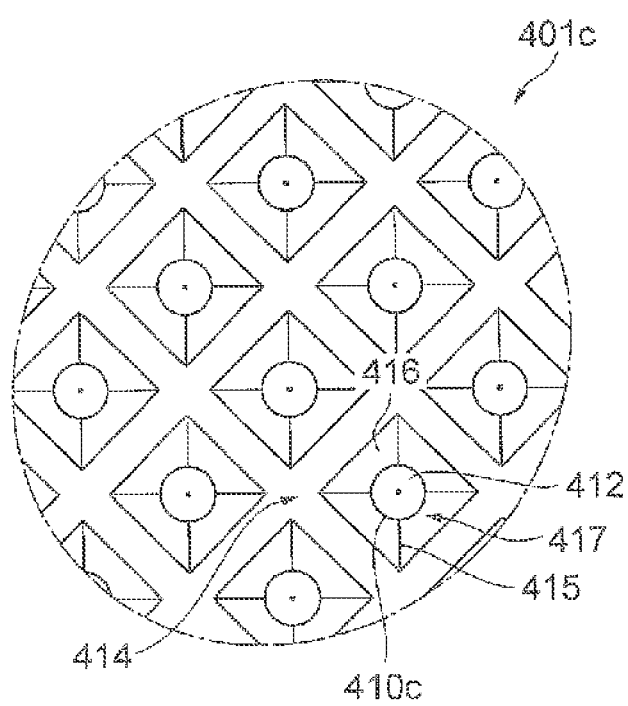
FIG. 24 is an enlarged plan view of the portion, which corresponds to the portion A in FIG. 4, of the closing jig for the green honeycomb molded body having the square cells according to the second embodiment.

As is illustrated in FIGS. 23 and 24 in which a portion corresponding to the portion A in FIG. 4 described above is enlarged, a closing jig 400 of this embodiment includes closing protrusions 410c in the same closing surface 401c of the closing jig 40 as in the first embodiment. Each of the closing protrusions 410c includes a quadrangular pyramidal base portion 416 and a conical tip end portion 412. The quadrangular pyramidal base portion 416 is located at the base portion of the closing protrusion 410c, and protrudes from the closing surface 401c. The quadrangular pyramidal base portion 416 has a truncated quadrangular pyramidal shape obtained by removing a quadrangular pyramid that is analogously reduced from a quadrangular pyramid having an apex angle larger than an apex angle of the conical tip end portion 412. At a tip end portion of the closing protrusion 410c, the conical tip end portion 412 is located at an upper side of the quadrangular pyramidal base portion 416. The conical tip end portion 412 has a conical shape having a bottom surface with a size corresponding to the top surface of the quadrangular pyramidal base portion 416. The apex angle of the conical tip end portion 412 is smaller than an apex angle made by lateral edges of the truncated quadrangular pyramid that is the quadrangular pyramidal base portion 416.

The quadrangular pyramidal base portion 416 includes a quadrangular pyramid side surface portion 417 that is a side surface of the truncated quadrangular pyramid, and a round-chamfered lateral edge portion 415 that is a lateral edge of the truncated triangular pyramid. At the round-chamfered lateral edge portion 415, each lateral edge of the truncated quadrangular pyramid is subjected to round-chamfering with a predetermined curvature. In addition, a valley between the quadrangular pyramidal base portions 416 of the closing protrusions 410c adjacent to each other includes a round-chamfered valley portion 414 that is a concave portion subjected to round-chamfering with a predetermined curvature.

As illustrated in FIG. 24, in the closing protrusions 410c, the apexes of the conical tip end portions 412 are arranged at positions corresponding to four square cells 70s which are adjacent to the periphery of one square cell 70s among the plurality of square cells 70s of the green honeycomb molded body 70 while centering the one square cell 70s with the partition walls 70w partitioning respective sides of the one square cell 70s interposed therebetween. In addition, the closing protrusions 410c are arranged in a direction in which the round-chamfered lateral edge portion 415 of the quadrangular pyramidal base portion 416 comes into contact with the partition walls 70w. The size of the quadrangular pyramidal base portion 416 is set in such a manner that a length obtained by projecting the round-chamfered later edge portion 415 onto the closing surface 401c from an immediately upper side of the closing surface 401c becomes equal to or slightly smaller than a length between opposite sides of each of the square cells 70s of the green honeycomb molded body 70.

In addition, as a closing jig 400 configured to close the bottom surface 71b which becomes an exhaust gas discharging side (outlet side) in a case where the green honeycomb molded body 70 is calcined and is used as the diesel particulate filter, a closing jig 400 having a closing surface 401c in which the closing protrusions 410c are disposed at position corresponding to square cells 70s other than the square cells 70s, to which the closing protrusion 410c correspond at the top surface 71a, is used.

(Closing Step)

Hereinafter, a step of closing the green honeycomb molded body 70 of this embodiment will be described. After performing the same cutting step as in the first embodiment, closing of the green honeycomb molded body 70 is performed. First, description will be given to a step of closing the top surface 71a which becomes an exhaust gas supply side (inlet side) in a case where the green honeycomb molded body 70 is calcined and is used as the diesel particulate filter.

Figure 25:
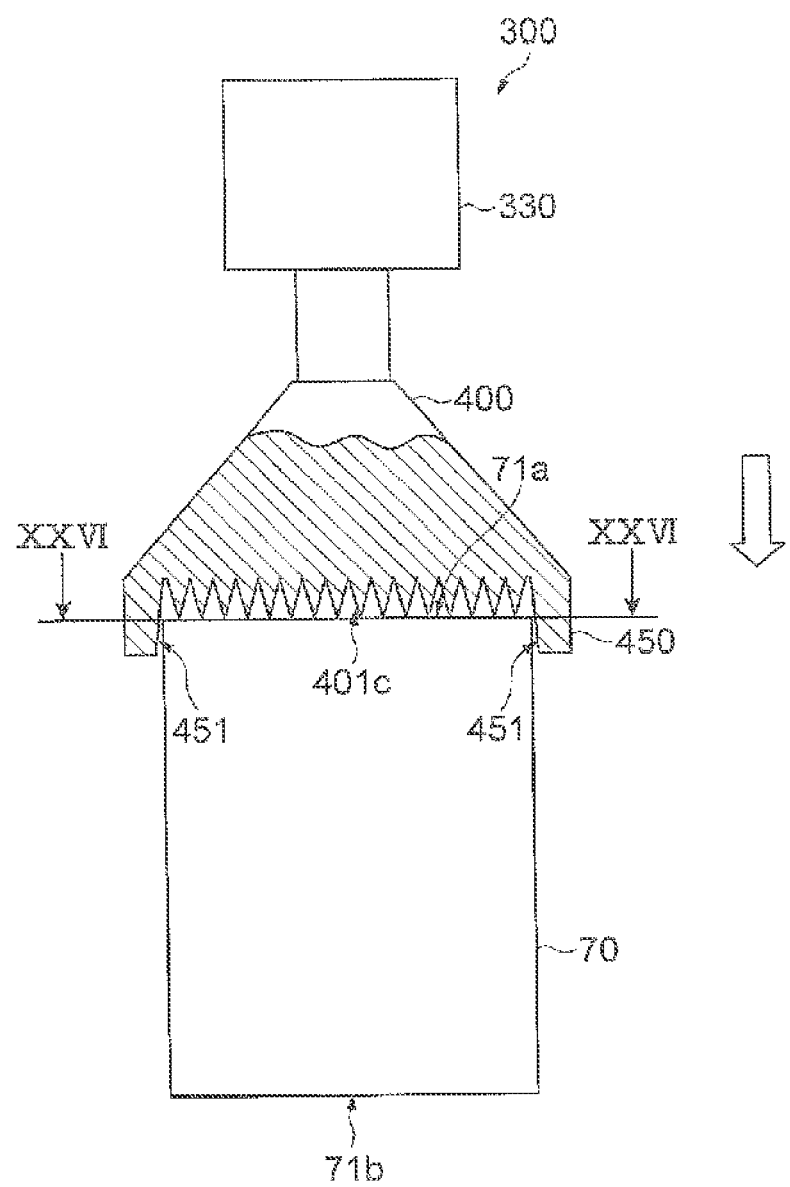
FIG. 25 is a partially cross-sectional view illustrating an initial state of a step of closing the green honeycomb molded body having the square cells according to the second embodiment.
Figure 26:
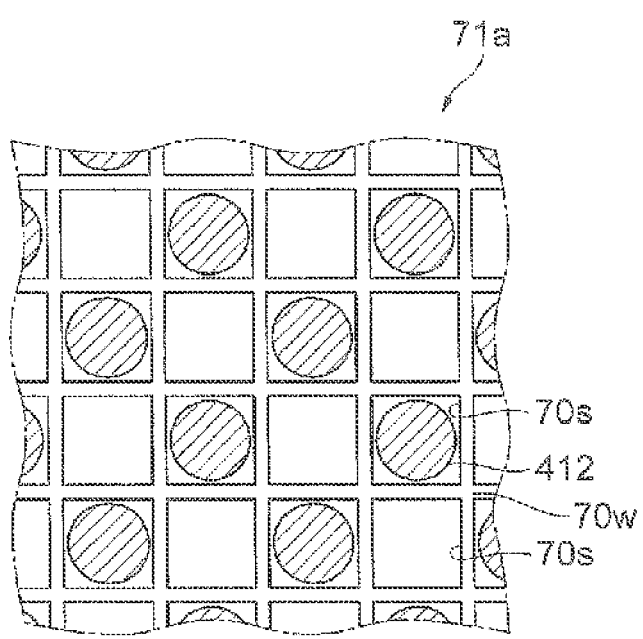
FIG. 26 is a cross-sectional view taken along line XXVI-XXVI in FIG. 25.

As illustrated in FIG. 25, an end on a top surface 71a side of the green honeycomb molded body 70 is inserted into the support socket portion 450 of the closing jig 400 of the ultrasonic closing machine 300. The closing jig 400 is vibrated with ultrasonic vibration from the horn unit 330. The tip ends of the closing protrusions 410c of the closing surface 401c are inserted into parts of the square sells 70s. As illustrated in FIG. 26, the conical tip end portions 412 of the closing protrusions 401c are inserted into four square cells 70s which are adjacent to the periphery of one square cell 70s while centering around the one square cell 70s with the partition walls 70w partitioning respective sides of the one square cell 70s interposed therebetween.

Figure 27:
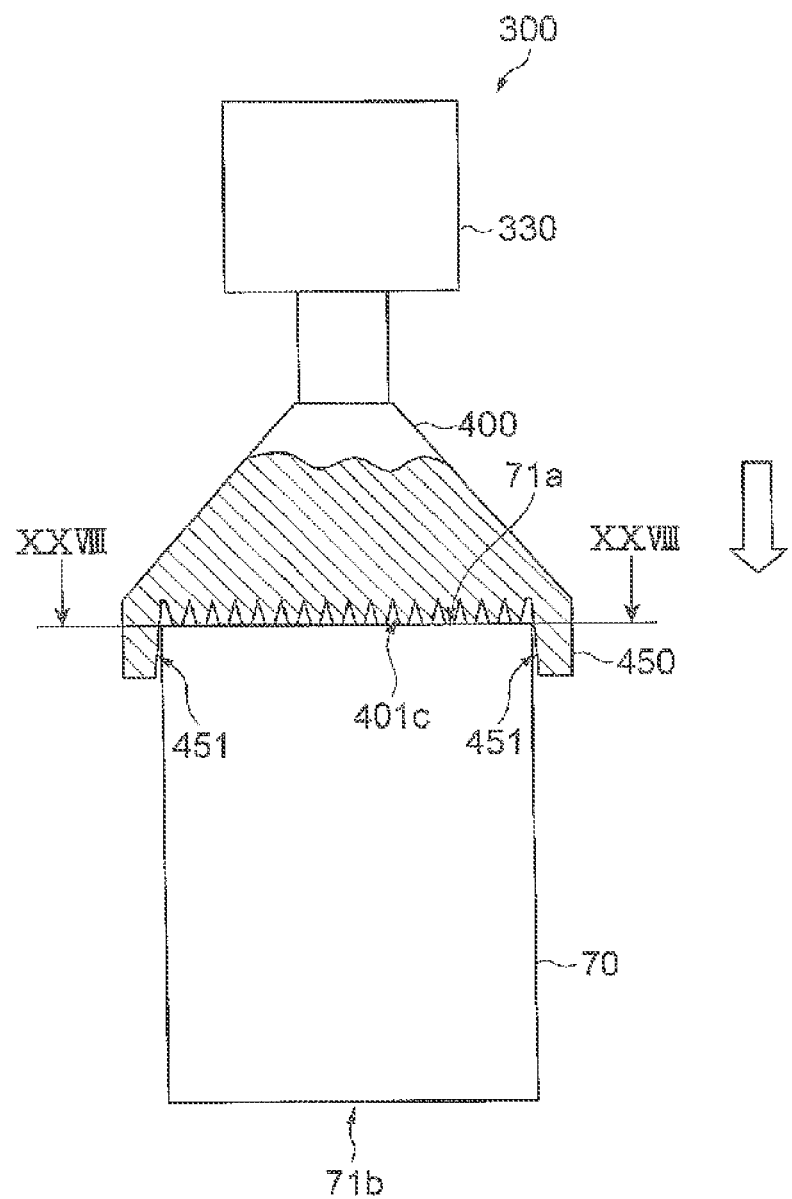
FIG. 27 is a partially cross-sectional view illustrating an intermediate state of the closing step in FIG. 25.
Figure 28:
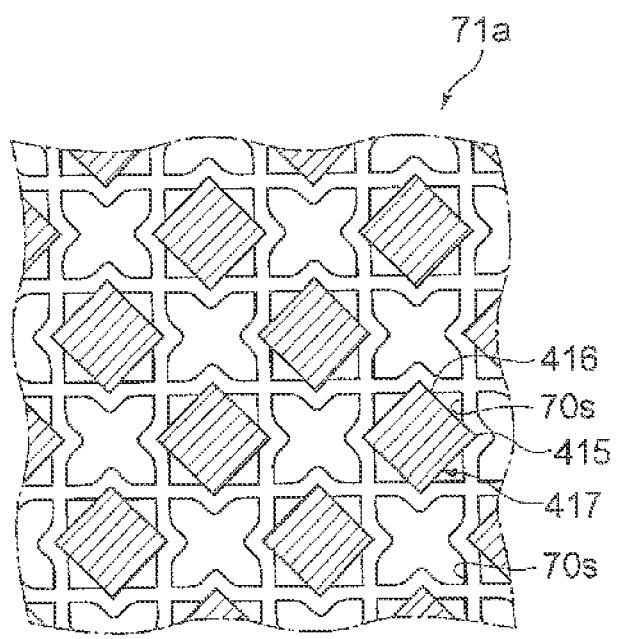
FIG. 28 is a cross-sectional view taken along line XXVIII-XXVIII in FIG. 27.

As illustrated in FIG. 27, when the closing protrusions 410c are further inserted into the square cells 70s, as illustrated in FIG. 28, the quadrangular pyramidal base portions 416 of the closing protrusion 410c are inserted into the square cell 70s. The round-chamfered lateral edge portions 415 of the quadrangular pyramidal base portion 416 come into contact with the partition walls 70w. Since the closing protrusions 410c are vibrated with ultrasonic vibration, the partition walls 70w liquefy and are pressed to close the square cell 70s into which the closing protrusion 410c is not inserted and which is located at the center of the four square cells 70s into which the closing protrusions 410c are inserted, respectively.

Figure 29:
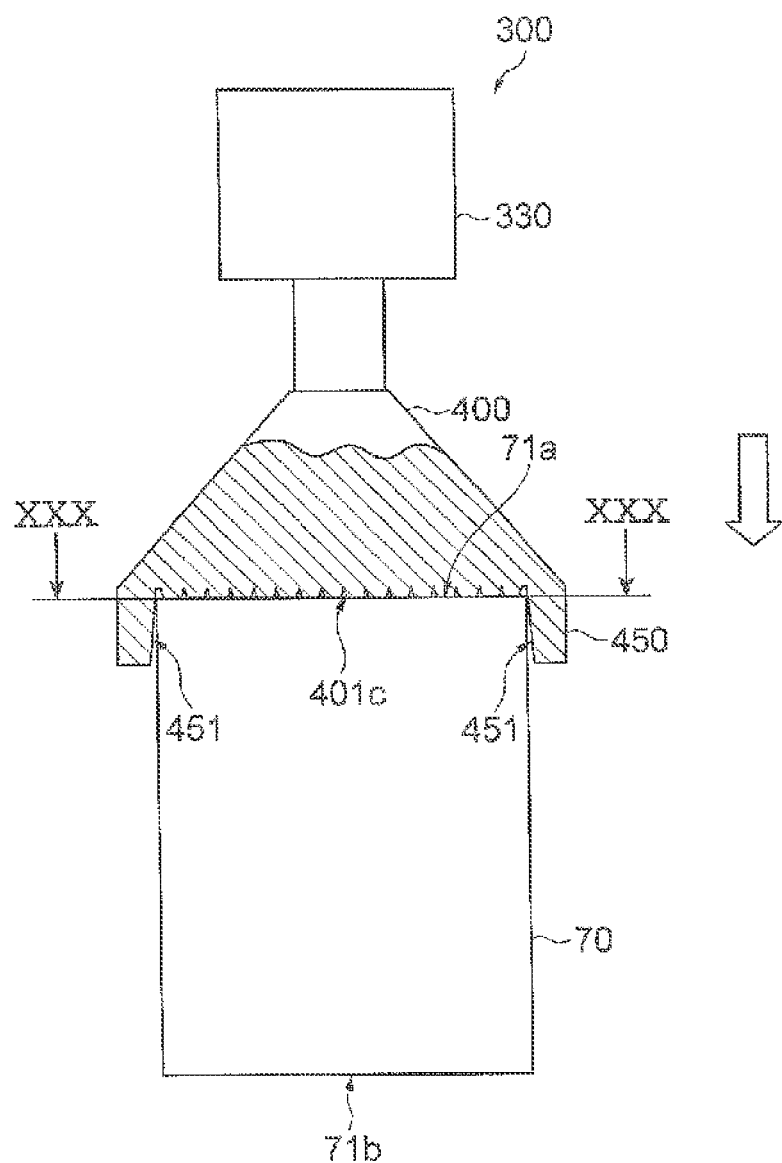
FIG. 29 is a partially cross-sectional view illustrating a final state of the closing step in FIG. 25.
Figure 30:
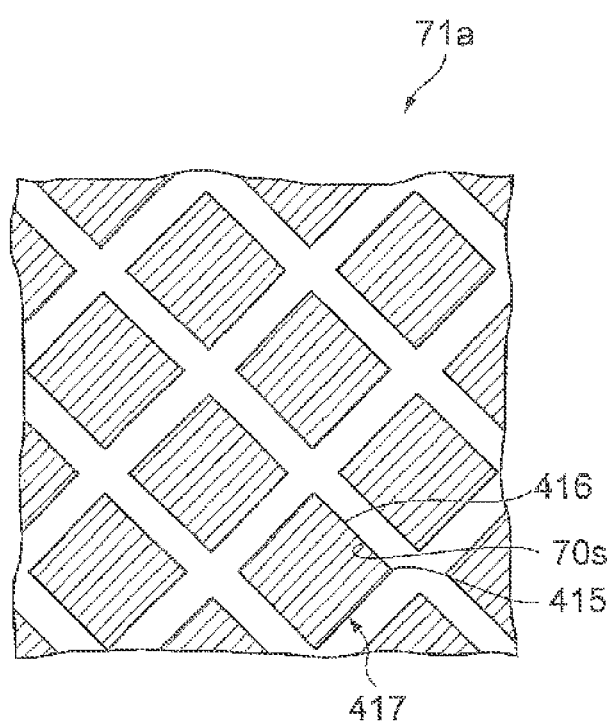
FIG. 30 is a cross-sectional view taken along line XXX-XXX in FIG. 29.

As illustrated in FIG. 29, when the closing protrusions 410c are further inserted into the square cells 70s, as illustrated in FIG. 30, the partition walls 70w, which are pressed from four directions while liquefying due to the round-chamfered lateral edge portion 415 and the quadrangular pyramid side surface portion 417 of the quadrangular pyramidal base portion 416, are integrally welded. The end of the welded partition walls 70w is brought into contact with the round-chamfered valley portion 414 of the closing surface 401c, and closing is completed in a state in which the end is subjected to round-chamfering corresponding to a shape of the round-chamfered valley portion 414. According to this, at the top surface 71a that becomes an exhaust gas supply side (inlet side), the one square cell 70s, which is surrounded by the four square cells 70s adjacent to the periphery of the one square cell 70s with the partition walls 70w partitioning the respective sides of the one square cell 70s interposed therebetween, is closed.

On the other hand, with regard to a step of closing the top surface 71b which becomes the exhaust gas discharging side (outlet side) in a case where the green honeycomb molded body 70 is calcined and is used as the diesel particulate filter, the closing is performed as described above using a closing jig 400 having a closing surface 401c in which the closing protrusions 410c are arranged at positions corresponding to square cell 70s other than the square cells 70s to which the closing protrusions 410c correspond at the top surface 71a. According to this, the square cells 70s other than the square cells 70s closed at the top surface 71a is closed at the bottom surface 71b.

According to this embodiment, the closing protrusions 410c are arranged at positions corresponding to the four square cells 70s which are adjacent to the periphery of the one square cell 70s among the plurality of square cells 70s having a square shape while centering around the one square cell 70s with the partition walls 70w partitioning the respective sides of the one square cell interposed therebetween. The quadrangular pyramidal base portion 416 has the truncated quadrangular pyramidal shape obtained by removing the quadrangular pyramid that is analogously reduced from the quadrangular pyramid having the apex angle larger than the apex angle of the conical tip end portion 412, and the round-chamfered lateral edge portions 415 come into contact with the partition walls 70w. Accordingly, the closing protrusions 410c are inserted into the four square cells 70s which are adjacent to the periphery of the one square cell 70s while centering around the one square cell 70s with the partition walls 70w partitioning the respective sides of the square cell 70s interposed therebetween. In addition, the square cell 70s that is located at the center of the four square cells 70s is pressed by the round-chamfered lateral edge portions 415 of the quadrangular pyramidal base portions 416 of the closing protrusions 410c which are inserted, and the partition walls 70w are welded to each other, and thus the central square cell 70s is closed. In this case, for example, when a square cell 70s, which is not closed at one end of the green honeycomb molded body 70, is closed at the other end, for example, in the case of using the honeycomb structure as the diesel particulate filter, it is possible to efficiently perform closing on the exhaust gas supply side and on the exhaust gas discharging side. Furthermore, since the closing surface 401a and the closing surface 401b of the closing jig 400 are mechanically parallel with each other, and the closing surface 401a and the closing surface 401b of the closing jig 400 are disposed to correspond to the normal positions of the square cells 70s in the top surface 71a and the bottom surface 71b, correction of deformation which occurs during an extrusion step or the above-described cutting step, and the closing are simultaneously performed.

[Third Embodiment]

Figure 31:
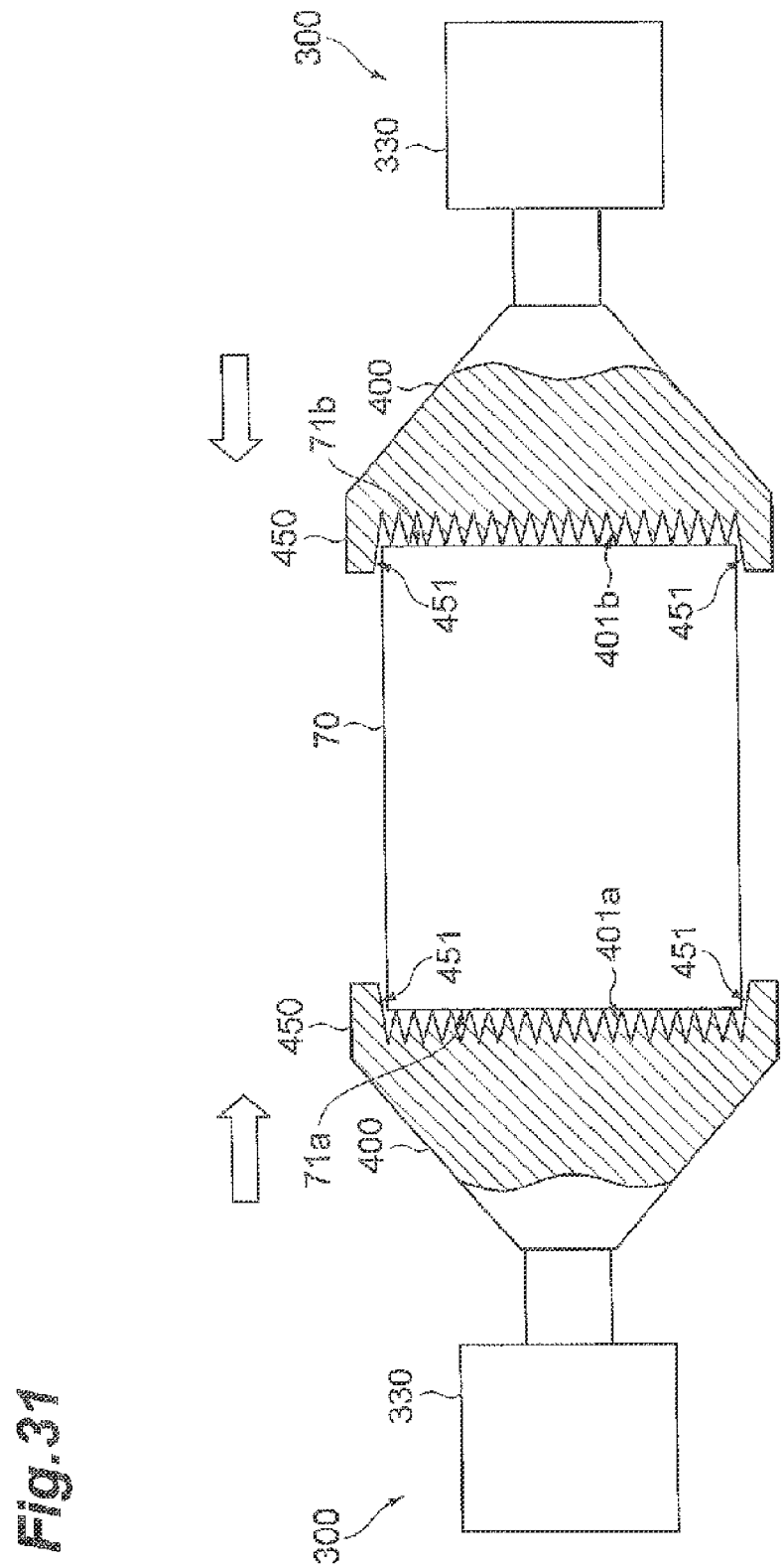
FIG. 31 is a partially cross-sectional view illustrating an initial state of a step of closing a green honeycomb molded body according to a third embodiment.
Figure 32:
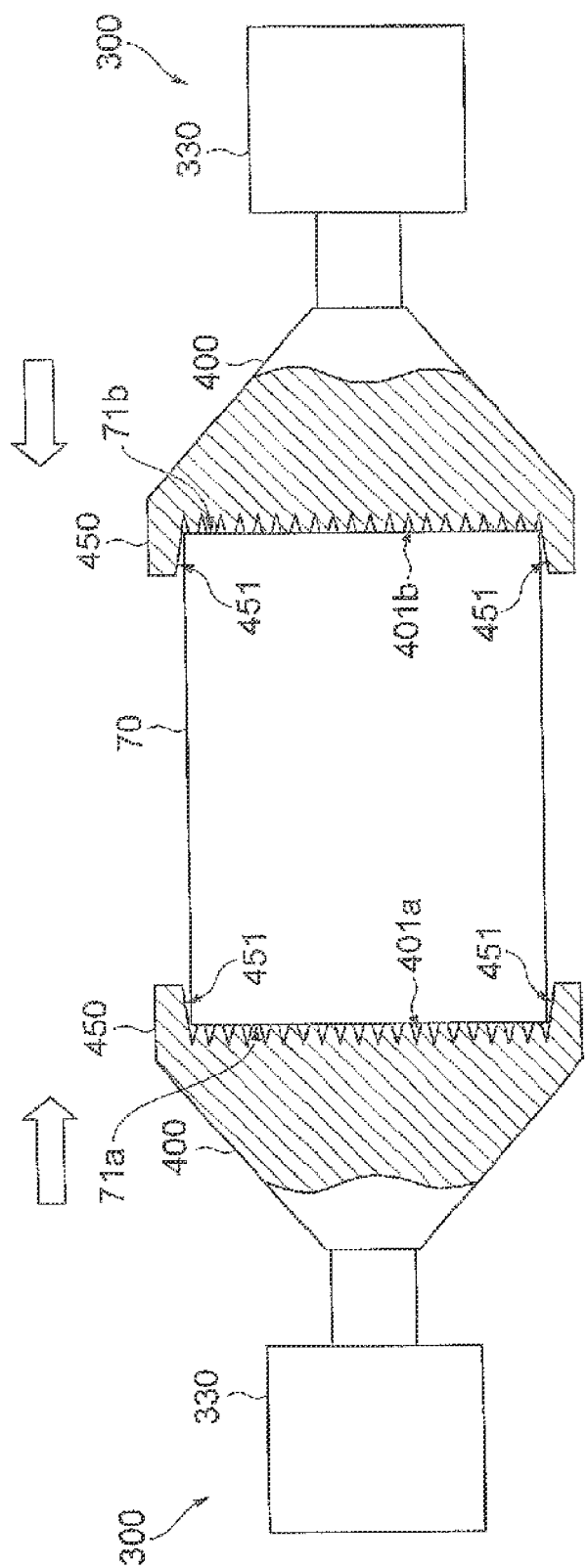
FIG. 32 is a partially cross-sectional view illustrating an intermediate state of the closing step in FIG. 31.
Figure 33:
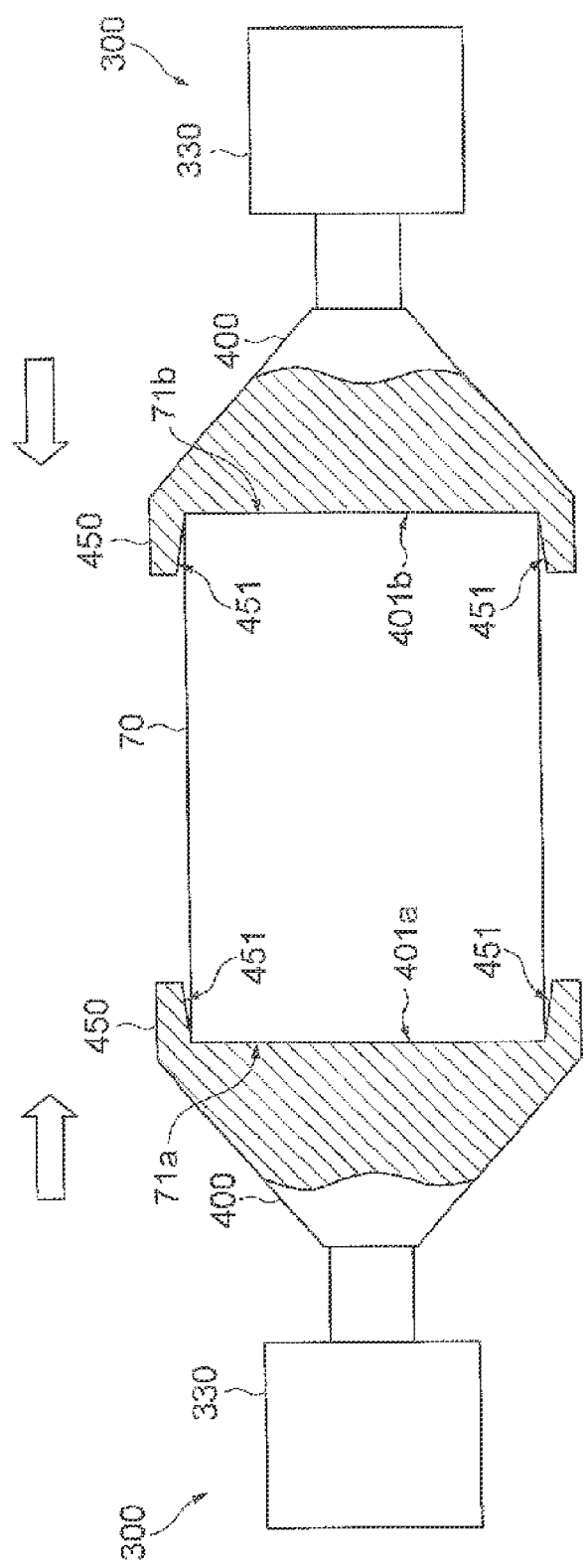
FIG. 33 is a partially cross-sectional view illustrating a final state of the closing step in FIG. 31.

Hereinafter, a third embodiment of the invention will be described. As illustrated in FIG. 31, in this embodiment, the regular hexagonal cells 70h of the top surface 71a and the bottom surface 71b of the green honeycomb molded body 70 having the regular hexagonal cells 70h are simultaneously closed. With respect to the green honeycomb molded body 70 that is subjected to the same cutting step as in the first embodiment, as is the case with the first embodiment, the closing jig 400 having the closing surface 401a is brought into contact with the top surface 71a, and the closing jig 400 having the closing surface 401b is brought into contact with the bottom surface 71b. Then, as illustrated in FIGS. 32 and 33, the closing step is performed in the same manner as the first embodiment. According to this, closing is performed in the same manner as the first embodiment at the top surface 71a and the bottom surface 71b.

According to this embodiment, in the closing step, the regular hexagonal cells 70h both in the top surface 71a and in the bottom surface 71b of the green honeycomb molded body 70 are simultaneously closed. Accordingly, it is possible to perform the closing of the regular hexagonal cells 70h in a more efficient manner in comparison to the method of individually closing the regular hexagonal cells 70h for each of the top surface 71a and the bottom surface 71b.

In addition, it is not necessary to close both the top surface 71a and the bottom surface 71b by using the ultrasonic closing machine 300 similar to this embodiment, and the partition walls 70W may be welded by using the ultrasonic closing machine 300 only on one side of the top surface 71a and the bottom surface 71b to close the regular hexagonal cells 70h.

[Fourth Embodiment]
(Closing Jig)

Figure 34:
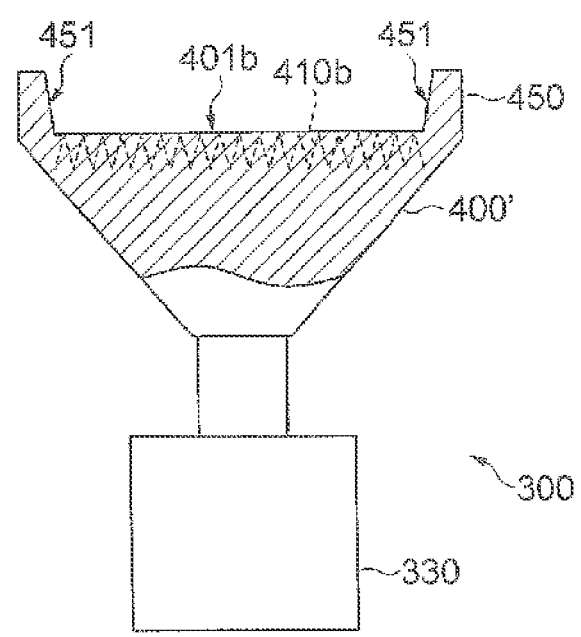
FIG. 34 is a partially cross-sectional view of a closing jig for a green honeycomb molded body according to a fourth embodiment, and illustrates a state in which closing protrusions are accommodated.
Figure 35:
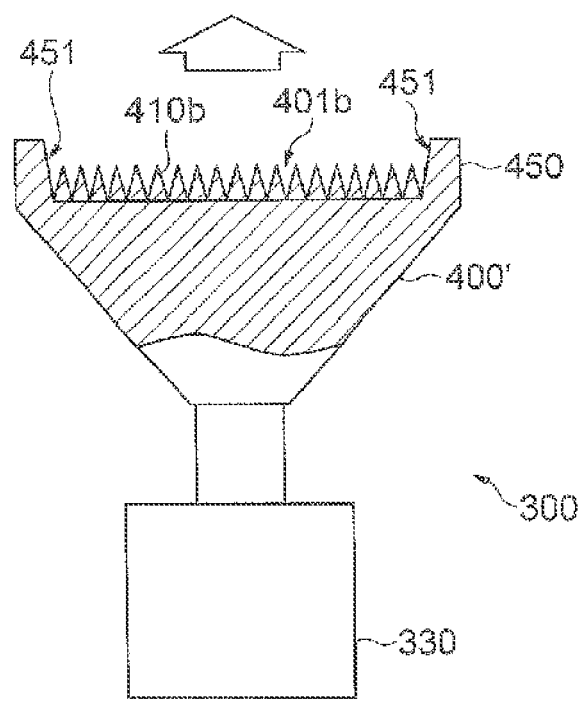
FIG. 35 is a partially cross-sectional view of the closing jig for a green honeycomb molded body according to the fourth embodiment, and illustrates a state in which the closing protrusions are protruded.

Hereinafter, a fourth embodiment of the invention will be described. As illustrated in FIGS. 34 and 35, a closing jig 400' for the bottom surface 71b of the green honeycomb molded body 70 according to this embodiment is capable of selectively changing a state in which the closing protrusions 410b are accommodated on an inner side of the closing surface 401b and a state in which the closing protrusions 410b protrude to the outside of the closing surface 401b. The closing protrusions 410b are arranged in the same manner as the first embodiment, and are capable of being accommodated on an inner side of the closing surface 401b and protruding to the outside of the closing surface 401b through holes having the same diameter of the bottom surface of the closing protrusion 410b. The accommodating and protruding of the closing protrusions 410b can be performed by a pneumatic mechanism or a hydraulic mechanism.

In addition, the same round-chamfered valley portion 414 as in the first embodiment may remain in the closing surface 401b in a state of accommodating the closing protrusions 410b, and it is not necessary for the closing surface 401b to be completely flat. The above-described configuration is also true of a closing jig 400' for the top surface 71a of the green honeycomb molded body 70.

(Cutting Step)

Figure 36:
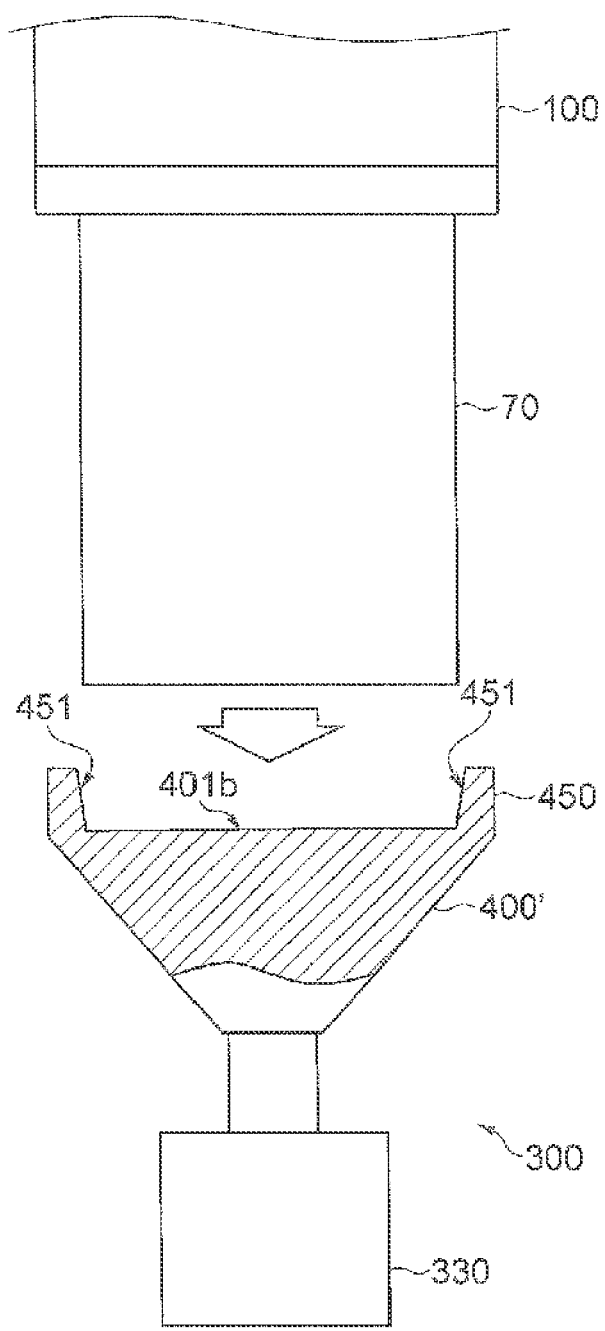
FIG. 36 is a partially cross-sectional view illustrating an initial state of a step of cutting out the green honeycomb molded body according to the fourth embodiment.
Figure 37:
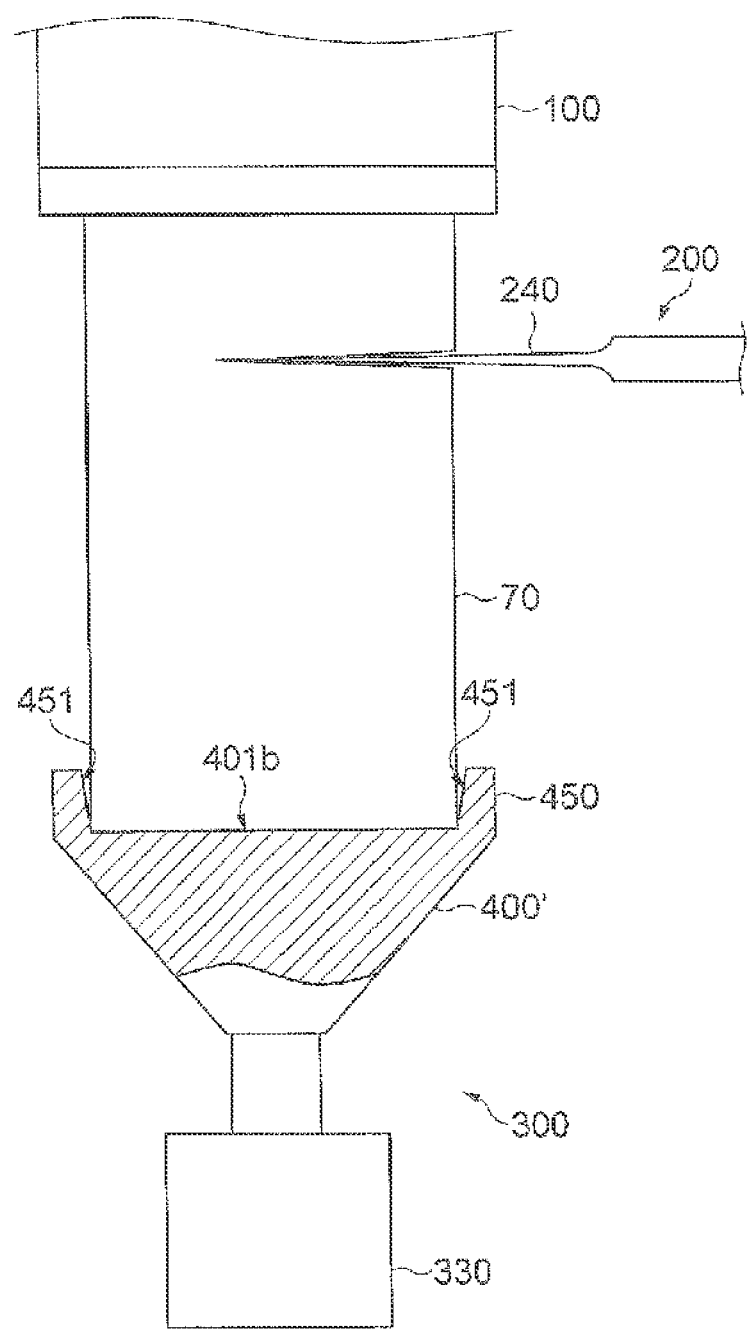
FIG. 37 is a partially cross-sectional view illustrating an intermediate state of the cutting step in FIG. 36.

Hereinafter, a step of cutting the green honeycomb molded body 70 of this embodiment will be described. As illustrated in FIG. 36, the bottom surface 71b of the green honeycomb molded body 70 having the regular hexagonal cells 70h immediately after being extrusion-molded from a raw material in a vertically downward direction by an extrusion molding machine 100 is supported by the closing surface 401b of the closing jig 400'. At this time, the closing jig 400' is in a state of accommodating the closing protrusions 410b on an inner side of the closing surface 401b. Next, as illustrated in FIG. 37, in a state in which the green honeycomb molded body 70 is supported by the closing jig 400', the green honeycomb molded body 70 is cut out by the cutting blade 240 of the ultrasonic cutting machine 200.

(Closing Step)

Figure 38:
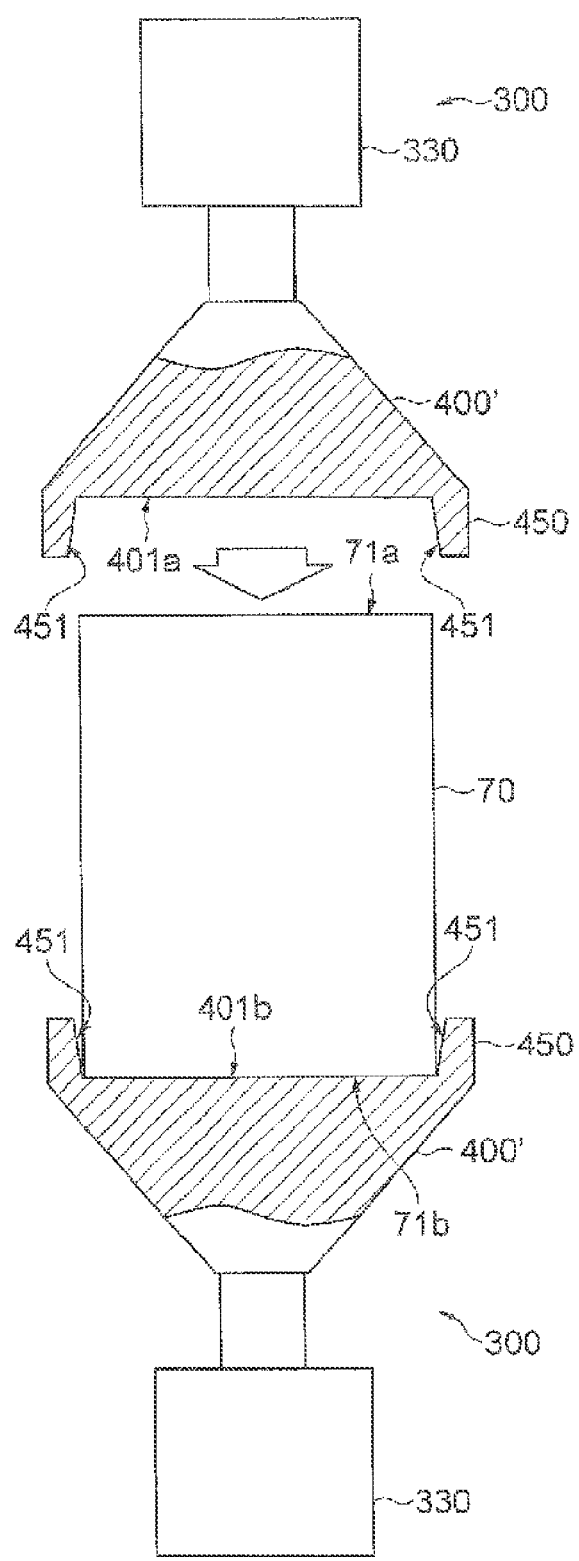
FIG. 38 is a partially cross-sectional view illustrating an initial state of a step of closing the green honeycomb molded body according to the fourth embodiment.
Figure 39:
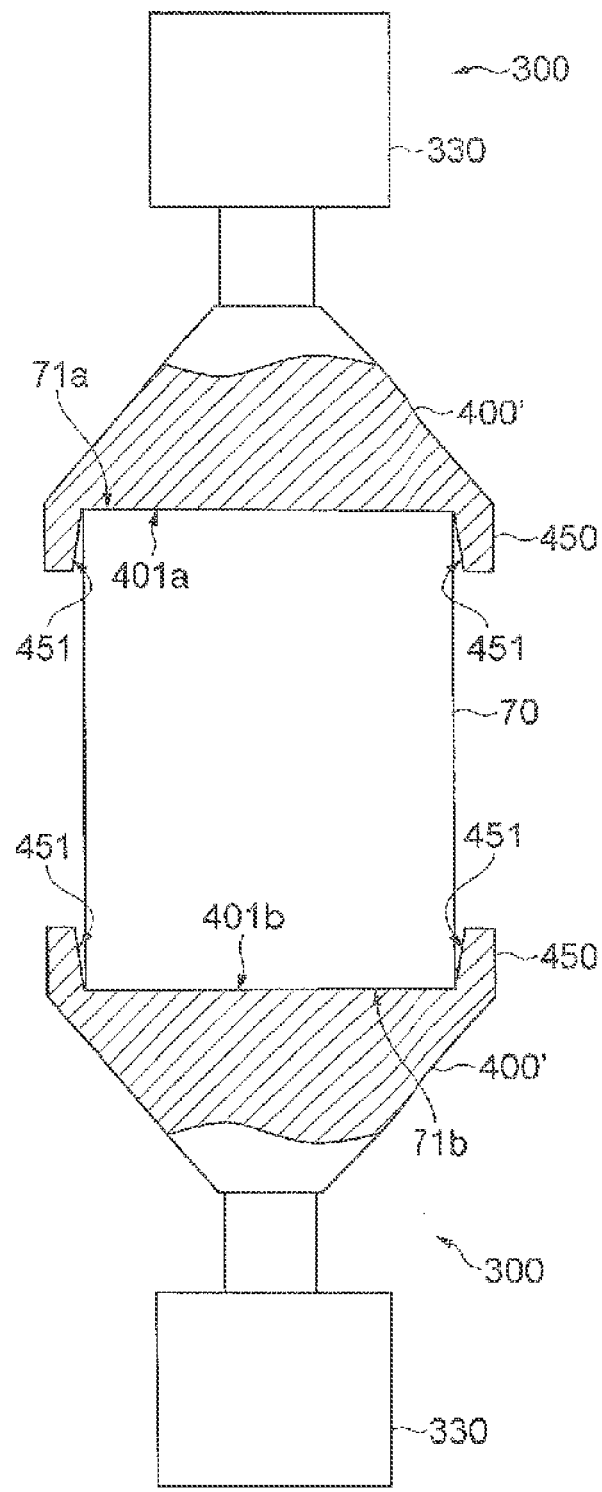
FIG. 39 is a partially cross-sectional view illustrating an intermediate state of the closing step in FIG. 38.

Next, a step of closing the green honeycomb molded body 70 of this embodiment will be described. As illustrated in FIGS. 38 and 39, the top surface 71a that is cut out during the cutting step is supported by the closing surface 401a of the closing jig 400'. At this time, the closing jig 400' is in a state of accommodating the closing protrusions 410a on an inner side of the closing surface 401a.

Figure 40:
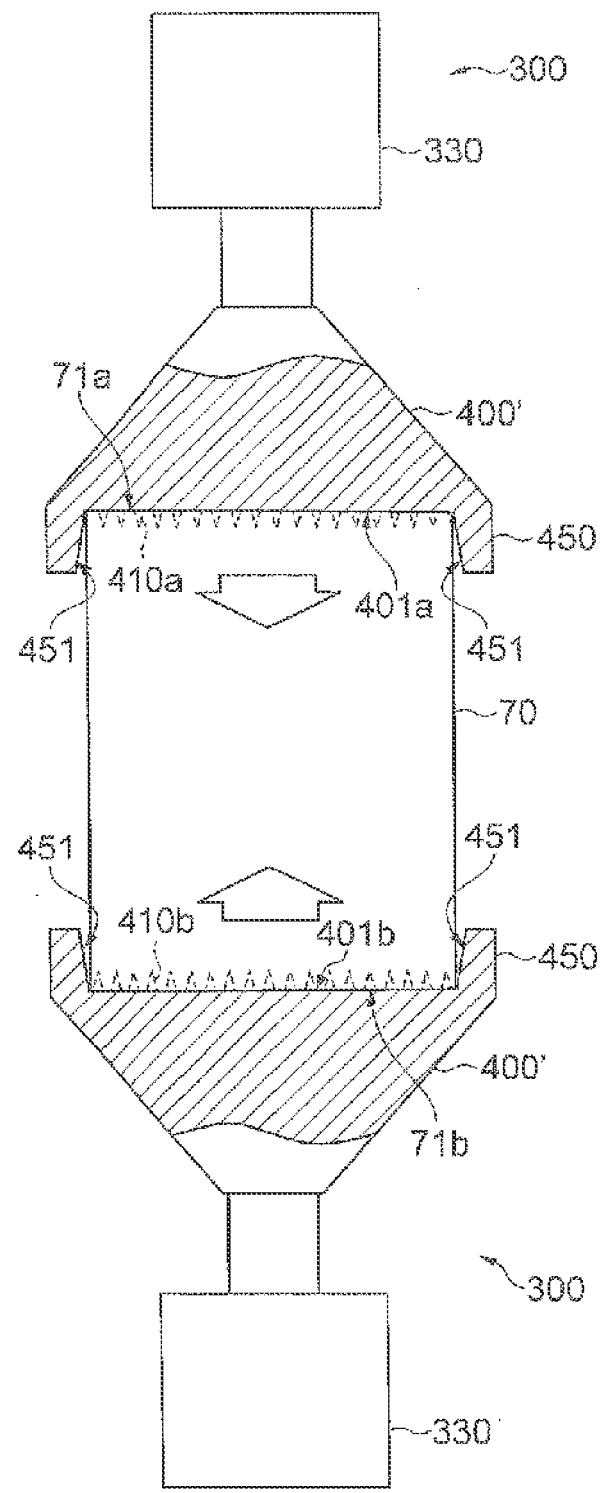
FIG. 40 is a partially cross-sectional view illustrating a state in which the closing step in FIG. 39 further progresses.

Next, as illustrated in FIG. 40, when it enters a state in which the closing protrusions 410a and 410b protrude from the closing surface 401a and 401b of the closing jig 400', respectively, and the closing protrusions 410a and 410b are inserted into parts of the regular hexagonal cells 70h, closing of the regular hexagonal cells 70h is performed in the same manner as the first embodiment.

In addition, it is not necessary to close both the top surface 71a and the bottom surface 71b by using the ultrasonic closing machine 300 similar to this embodiment, and the partition walls 70W may be welded by using the ultrasonic closing machine 300 only on one side of the top surface 71a and the bottom surface 71b to close the regular hexagonal cells 70h. In this case, at the top surface 71a, closing may be performed by using the closing jig 400' having the closing surface 401a, and at the bottom surface 71b, closing may be performed with respect to regular hexagonal cells 70h, which are not closed at the top surface 71a, by using the same closing material as the related art. Alternatively, at the bottom surface 71b, closing may be performed by using the closing jig 400' having the closing surface 401b, and at the top surface 71a, closing may be performed with respect to regular hexagonal cells 70h, which are not closed at the bottom surface 71b, by using the same closing material as the related art.

When the diameter of the green honeycomb molded body 70 increases, in the case of extrusion-molding the green honeycomb molded body 70 from a raw material in a horizontal direction, bending due to the gravity increases, and thus it may be difficult to support the green honeycomb molded body 70 on the side surface 71c. However, according to this embodiment, the bottom surface 71b of the green honeycomb molded body 70 immediately after being extrusion-molded from a raw material in a vertically downward direction by the extrusion molding machine 100 is supported by the closing jig 400'. According to this, even in the green honeycomb molded body 70 having a large diameter, it is possible to support the green honeycomb molded body 70 without causing bending or distortion of the regular hexagonal cell 70h. Furthermore, in the subsequent closing step, the plurality of closing protrusions 410a and 410b of the closing jig 400' are inserted into parts of the regular hexagonal cells 70h of the green honeycomb molded body 70, which is supported, to weld the partition walls 70W to each other, thereby closing the regular hexagonal cells 70h. According to this, supporting and closing of the green honeycomb molded body 70 can be continuously performed with efficiency.

In addition, according to this embodiment, the closing jig 400' can selectively change the state in which the closing protrusions 410b are accommodated on an inner side of the closing surface 401b, and the state in which the closing protrusions 410b protrude to the outside of the closing surface 401b. The bottom surface 70b of the green honeycomb molded body 70 immediately after being extrusion-molded from the raw material in a vertically downward direction by the extrusion molding machine 100 is supported by the closing surface 401b of the closing jig 400' in a state in which the closing protrusions 410b are accommodated on an inner side of the closing surface 401b. Accordingly, even in the green honeycomb molded body 70 having a large diameter, it is possible to support the green honeycomb molded body 70 in a more stable manner without causing bending or distortion of the regular hexagonal cells 70h. In addition, in the closing step, in a state in which the closing protrusions 410b protrude to the outside of the closing surface 401b, the closing protrusions 410b of the closing jig 400' are inserted into parts of the regular hexagonal cells 70h in the bottom surface 71b of the green honeycomb molded body 70 to weld the partition walls 70W to each other, thereby closing the hexagonal cells 70h. According to this, it is possible to weld the partition wall 70W while supporting the green honeycomb molded body 70, thereby closing the hexagonal cells 70h.

In addition, the invention is not limited to the above-described embodiments, and various modification can be made.

Industrial Applicability

According to the closing jig for the green honeycomb molded body and the method for producing the honeycomb structure according to the embodiment of the invention, insertion into the through-holes is easy, and it is possible to close the green honeycomb molded body in a relatively efficient manner.

Reference Signs List

70: Green honeycomb molded body
71a: Top surface
71b: Bottom surface
71c: Side surface
70h: Regular hexagonal cell
70W: Partition wall
70s: Square cell
70w: Partition wall
100: Extrusion molding machine
120: Stand
140: Roller conveyor
200: Ultrasonic cutting machine
210: Ultrasonic signal transmitter
220: Ultrasonic vibrator unit
230: Horn unit
240: Cutting blade
300: Ultrasonic closing machine
310: Ultrasonic signal transmitter
320: Ultrasonic vibrator unit
330: Horn unit
400: Closing jig
400': Closing jig
401a, 401b, 401c: Closing surface
410a, 410b, 410c: Closing protrusion
411: Triangular pyramidal base portion
412: Conical tip end portion
413: Triangular pyramid side surface portion
414: Round-chamfered valley portion
415: Round-chamfered lateral edge portion
416: Quadrangular pyramidal base portion
417: Quadrangular pyramid side surface portion
422: Conical side surface portion
450: Support socket portion
451: Inclined surface

The invention claimed is:

1. A closing jig for a green honeycomb molded body in which a plurality of through-holes partitioned from each other by partition walls are opened to an end surface of a columnar body, and which becomes a honeycomb structure, in which a plurality of holes are opened to the end surface of the columnar body, when being calcined, comprising:
   a plurality of closing protrusions which are arranged at positions corresponding to parts of the plurality of the through-holes, and are inserted into the parts of the through-holes to weld the partition walls to each other so as to close the through-holes,
   wherein each of the closing protrusions includes,
   a conical tip end portion which is located at a tip end portion of the closing protrusion and has a conical shape, and
   a pyramidal base portion which is located at a base portion of the closing protrusion, and has a truncated pyramidal shape obtained by removing a pyramid which is analogously reduced from a pyramid having an apex angle larger than an apex angle of the conical tip end portion.

2. The closing jig for a green honeycomb molded body according to claim 1,
   wherein each of lateral edges of the pyramidal base portion is round-chamfered with a predetermined curvature.

3. The closing jig for a green honeycomb molded body according to claim 1,
   wherein a valley between the pyramidal base portions of the closing protrusions adjacent to each other is round-chamfered with a predetermined curvature.

4. The closing jig for a green honeycomb molded body according to claim 1,
   wherein the closing protrusions are inserted into the parts of the through-holes while being vibrated with ultrasonic waves to weld the partition walls to each other so as to close the through-holes.

5. The closing jig for a green honeycomb molded body according to claim 1,
wherein the closing protrusions are arranged at positions corresponding to six through-holes which are adjacent to the periphery of one through-hole among the plurality of through-holes having a hexagonal shape while centering around the one through-hole, and
the pyramidal base portion has a truncated triangular pyramidal shape obtained by removing a triangular pyramid that is analogously reduced from a triangular pyramid having an apex angle larger than an apex angle of the conical tip end portion, and lateral edges of the pyramidal base portion come into contact with the partition walls.

6. The closing jig for a green honeycomb molded body according to claim 1,
wherein the closing protrusions are arranged at positions corresponding to four through-holes which are adjacent to the periphery of one through-hole among the plurality of through-holes having a rectangular shape while centering around the one through-hole with the partition walls partitioning respective sides of the one rectangular through-hole interposed therebetween, and
the pyramidal base portion has a truncated quadrangular pyramidal shape obtained by removing a quadrangular pyramid that is analogously reduced from a quadrangular pyramid having an apex angle larger than an apex angle of the conical tip end portion, and lateral edges of the pyramidal base portion come into contact with the partition walls.

7. A method for producing a honeycomb structure in which a plurality of holes are opened to an end surface of a columnar body, comprising:
a closing step of inserting a plurality of closing protrusions of a closing jig into parts of a plurality of through-holes of a green honeycomb molded body, in which the plurality of through-holes partitioned from each other by partition walls are opened to an end surface of a columnar body and which becomes the honeycomb structure when being calcined, to weld the partition walls to each other so as to close the through-holes,
wherein in the closing step,
the through-holes are closed by using the closing jig in which the closing protrusions are arranged at positions corresponding to the parts of the plurality of through-holes, and each of the closing protrusions includes a conical tip end portion which is located at a tip end portion of the closing protrusion and has a conical shape, and a pyramidal base portion which is located at a base portion of the closing protrusion and has a truncated pyramidal shape obtained by removing a pyramid analogously reduced from a pyramid having an apex angle larger than an apex angle of the conical tip end portion.

8. The method for producing a honeycomb structure according to claim 7,
wherein in the closing step, the through-holes are closed by using the closing jig in which each lateral edge of the pyramidal base portion is round-chamfered with a predetermined curvature.

9. The method for producing a honeycomb structure according to claim 7,
wherein in the closing step, the through-holes are closed by using the closing jig in which a valley between the pyramidal base portions of the closing protrusions adjacent to each other is round-chamfered with a predetermined curvature.

10. The method for producing a honeycomb structure according to claim 7,
wherein in the closing step, the closing protrusions are inserted into the parts of the through-holes while being vibrated with ultrasonic waves to weld the partition walls to each other so as to close the through-holes.

11. The method for producing a honeycomb structure according claim 7,
wherein in the closing step, the through-holes are closed by using the closing jig in which the closing protrusions are arranged at positions corresponding to six through-holes which are adjacent to the periphery of one through-hole among the plurality of through-holes having a hexagonal shape while centering around the one through-hole, the pyramidal base portion has a truncated triangular pyramidal shape obtained by removing a triangular pyramid that is analogously reduced from a triangular pyramid having an apex angle larger than an apex angle of the conical tip end portion, and lateral edges of the pyramidal base portion come into contact with the partition walls.

12. The method for producing a honeycomb structure according to claim 7,
wherein in the closing step, the through-holes are closed by using the closing jig in which the closing protrusions are arranged at positions corresponding to four through-holes which are adjacent to the periphery of one through-hole among the plurality of through-holes having a rectangular shape while centering around the one through-hole with the partition walls partitioning respective sides of the one rectangular through-hole interposed therebetween, the pyramidal base portion has a truncated quadrangular pyramidal shape obtained by removing a quadrangular pyramid that is analogously reduced from a quadrangular pyramid having an apex angle larger than an apex angle of the conical tip end portion, and lateral edges of the pyramidal base portion come into contact with the partition walls.

* * * * *